(12) United States Patent
Nasu et al.

(10) Patent No.: US 10,221,931 B2
(45) Date of Patent: Mar. 5, 2019

(54) DRIVING FORCE CONTROL SYSTEM FOR VEHICLE

(71) Applicant: Toyota Jidosha Kabushiki Kaisha, Toyota-shi (JP)

(72) Inventors: Takanobu Nasu, Sagamihara (JP); Junya Oota, Munich (DE); Hiroshi Isono, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 107 days.

(21) Appl. No.: 15/583,251

(22) Filed: May 1, 2017

(65) Prior Publication Data
US 2017/0328461 A1 Nov. 16, 2017

(30) Foreign Application Priority Data
May 11, 2016 (JP) .................. 2016-095499

(51) Int. Cl.
| | |
|---|---|
| *F16H 48/36* | (2012.01) |
| *F16H 48/10* | (2012.01) |
| *F16H 57/12* | (2006.01) |
| *B60W 50/00* | (2006.01) |
| *B60K 17/354* | (2006.01) |
| *B60K 23/04* | (2006.01) |
| *B60W 10/16* | (2012.01) |

(52) U.S. Cl.
CPC .......... *F16H 48/36* (2013.01); *B60K 17/354* (2013.01); *B60K 23/04* (2013.01); *B60W 10/16* (2013.01); *B60W 50/0098* (2013.01); *F16H 48/10* (2013.01); *F16H 57/12* (2013.01); *B60K 2023/043* (2013.01); *B60K 2023/046* (2013.01); *B60W 2050/0096* (2013.01); *F16H 2048/364* (2013.01); *F16H 2057/123* (2013.01); *Y02T 10/7258* (2013.01)

(58) Field of Classification Search
CPC .... F16H 48/36; F16H 2048/364; F16H 57/12; F16H 2057/123; B60K 2023/043; B60W 10/16
See application file for complete search history.

(56) References Cited

U.S. PATENT DOCUMENTS

| | | | | |
|---|---|---|---|---|
| 5,624,346 A | * | 4/1997 | Hirota | ............... F16H 48/10 475/249 |
| 8,303,451 B2 | * | 11/2012 | Yokoo | ............... F16H 48/36 475/231 |
| 2014/0162842 A1 | | 6/2014 | Severinsson et al. | |

FOREIGN PATENT DOCUMENTS

JP 2012-519812 8/2012

* cited by examiner

*Primary Examiner* — Erin D Bishop
(74) *Attorney, Agent, or Firm* — Oblon, McClelland, Maier & Neustadt, L.L.P.

(57) ABSTRACT

A driving force control system for a vehicle is provided to control a torque vectoring device is provided. A controller is configured to bring the torque vectoring device into a preparatory state in which the differential torque and the differential limit torque are equalized to each other when shifting the operating mode between the differential mode and the differential limit mode, and to shift the operating mode of the torque vectoring device by gradually reducing a difference between the differential torque and the differential limit torque.

6 Claims, 20 Drawing Sheets

DRIVING FORCE CONTROL SYSTEM FOR VEHICLE

CROSS REFERENCE TO RELATED APPLICATIONS

The present application claims the benefit of priority to Japanese Patent Application No. 2016-095499 filed on May 11, 2016 with the Japanese Patent Office, the entire contents of which are incorporated herein by reference in its entirety.

BACKGROUND

Field of the Disclosure

Embodiments of the present application relate to the art of a driving force control system for a vehicle having a torque vectoring device.

Discussion of the Related Art

U.S. Patent Publication No. 2014/162842 describes one example of a torque vectoring device including a differential mechanism for distributing torque of a prime mover to right and left wheels, and a differential motor for applying torque to one of rotary elements of the differential mechanism to control distribution of the torque to the right and left wheels. U.S. Patent Publication No. 2014/162842 further describes a controller configured to calculate torque requests to a torque vectoring motor based on a plurality of programs for controlling the current vehicle state and a plurality of variables representing the current vehicle state. According to the teachings of U.S. Patent Publication No. 2014/162842, the current vehicle state includes: vehicle stability; traction performance; regenerative braking; hybrid control; and yaw damping, and the variables are determined based on detected values of those factors.

Turning performance of vehicles may be improved by using the torque vectoring device taught by U.S. Patent Publication No. 2014/162842 to vary torques delivered to each drive wheel. However, the drive wheel may slip on a wavy road, and a low friction road such as a water pool, a frozen road etc. If one of the drive wheels causes a slip, driving force of the drive wheels may not be transmitted certainly to the road even if the torques delivered to each drive wheel is adjusted by the conventional torque vectoring device. In order to apply driving forces of the drive wheels certainly to the road surface when travelling on the slippery road or when a large driving force is required during propulsion in a straight line, a differential rotation between the drive wheels caused by the torque vectoring device may have to be limited.

SUMMARY

Aspects of the present disclosure have been conceived noting the foregoing technical problems, and it is therefore an object of the present application is to provide a driving force control system for controlling a torque vectoring device having a differential rotation limiting function.

Embodiments of the present application relate to driving force control system for a vehicle comprising: a differential mechanism that distributes torque delivered from a prime mover to a right wheel and a left wheel through a plurality of rotary elements including gears; a differential motor that controls a split ratio of the torque distributed to the right wheel and the left wheel by applying differential torque to any one of the rotary elements, so as to allow the right wheel and the left wheel to perform a differential rotation therebetween; a limited slip differential that limits the differential rotation between the right wheel and the left wheel by applying a frictional braking force to a rotary member between the differential motor and the limited slip differential thereby applying differential limit torque to the rotary member; a controller that controls the differential motor and the limited slip differential; and a torque vectoring device in which an operating mode is switched between differential mode in which the differential torque overwhelms the differential limit torque and differential limit mode in which the differential limit torque overwhelms the differential torque.

In order to achieve the above-explained objective, according to the embodiment of the present application, the controller is configured to: bring the torque vectoring device into a preparatory state in which the differential torque and the differential limit torque are equalized to each other when shifting the operating mode between the differential mode and the differential limit mode; and shift the operating mode of the torque vectoring device between the differential mode and the differential limit mode by gradually reducing a difference between the differential torque and the differential limit torque.

In a non-limiting embodiment, the controller may be further configured to gradually reduce the difference between the differential torque and the differential limit torque by changing at least any one of the differential torque and the differential limit torque based on at least any one of a changing function and a changing coefficient.

In a non-limiting embodiment, the changing function and changing coefficient include a first changing function and a first changing coefficient for changing at least any one of the differential torque and the differential limit torque, and a second changing function and a second changing coefficient for changing the other one of the differential torque and the differential limit torque.

In a non-limiting embodiment, the differential mechanism may include a transmission mechanism. In addition, the controller may be further configured to reduce backlash in the transmission mechanism by generating the differential limit torque while keeping the differential torque constant.

In a non-limiting embodiment, the controller may be further configured to: obtain at least one of the differential torque and the differential limit torque by increasing the differential torque while keep the differential limit torque constant in a factory before shipment or when the vehicle is stopped; and update a design value of the differential torque or the differential limit torque in the preparatory state.

In a non-limiting embodiment, the controller may be further configured to obtain at least one of the differential torque and the differential limit torque in the preparatory state by increasing the differential torque in a forward direction while keeping the differential limit torque to a first torque, and by increasing the differential torque in a reverse direction while keeping the differential limit torque to a second torque.

Thus, according to the embodiment of the present application, a difference between the differential torque and the differential limit torque is reduced gradually when shifting the operating mode of the torque vectoring device between the differential mode and the differential limit mode. According to the embodiment of the present application, therefore, the operating mode of the torque vectoring device may be shifted smoothly between the differential mode and the differential limit mode without causing shocks.

As described, the difference between the differential torque and the differential limit torque may be reduced gradually based on at least any one of a predetermined changing function and a changing coefficient to bring the torque vectoring device into the preparatory state when switching the operating mode of the torque vectoring device. According to the embodiment of the present application, therefore, the operating mode of the torque vectoring device may be shifted smoothly between the differential mode and the differential limit mode without causing shocks.

Specifically, the difference between the differential torque and the differential limit torque is reduced gradually based on at least any one of the first changing function and the first changing coefficient, and at least any one of the second changing function and the second changing coefficient. According to the embodiment of the present application, therefore, the operating mode of the torque vectoring device may be shifted properly between the differential mode and the differential limit mode.

As also described, backlash in the transmission mechanism of the torque vectoring device is reduced by controlling the differential limit torque and the differential torque. According to the embodiment of the present application, therefore, the operating mode of the torque vectoring device may be shifted properly without delay.

As also described, the controller may be further configured to update a point at which the differential torque and the differential limit torque are equalized to each other in a factory before shipment or when the vehicle is stopped. According to the embodiment of the present application, therefore, the operating mode of the torque vectoring device may be shifted properly between the differential mode and the differential limit mode.

In addition, when detecting the point at which the differential torque and the differential limit torque are equalized to each other in the preparatory mode, a rotational direction of the differential torque is reversed and the differential limit torque is altered to reduce the backlash in the transmission mechanism. According to the embodiment of the present application, therefore, the operating mode of the torque vectoring device may be shifted promptly between the differential mode and the differential limit mode.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
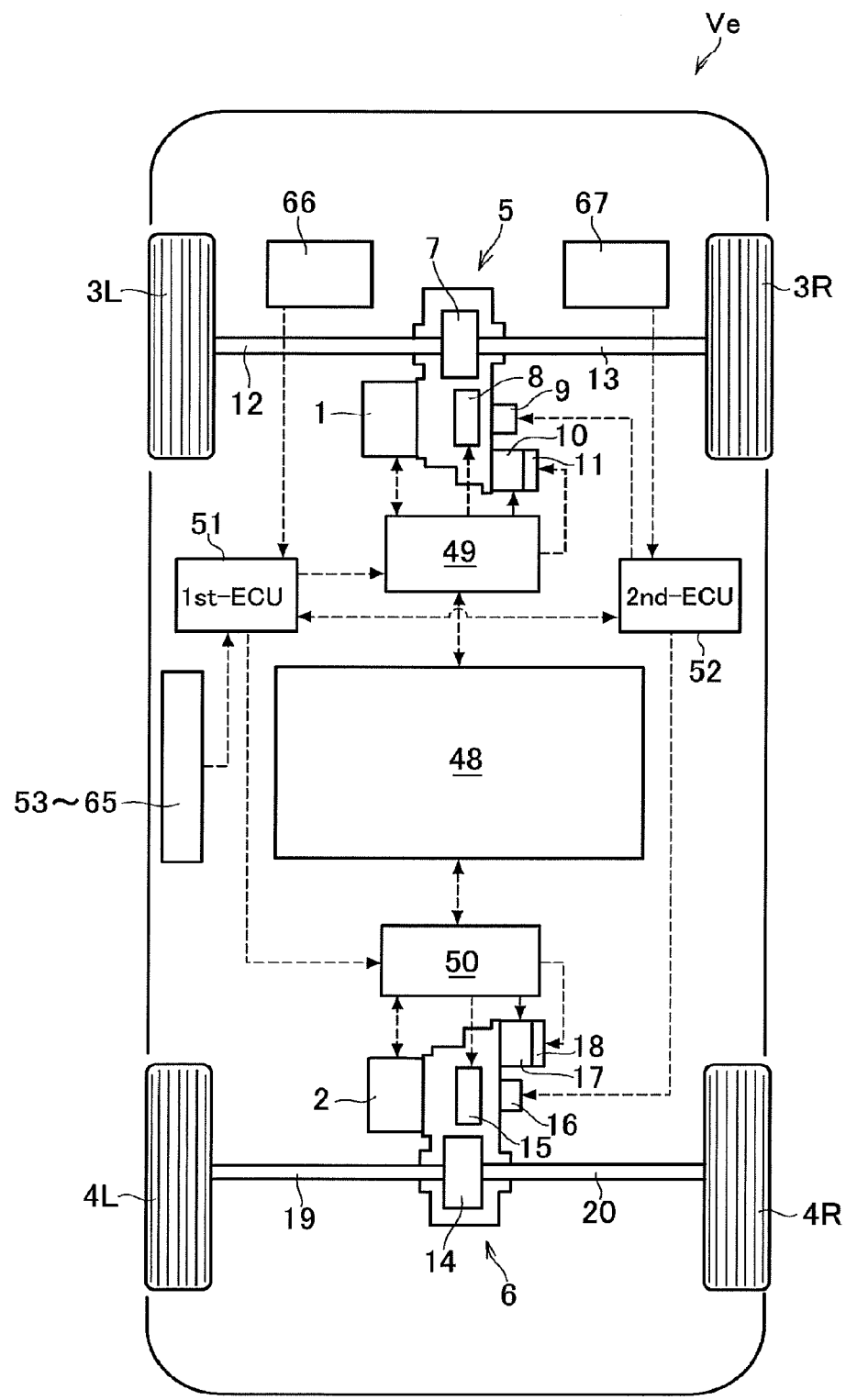
FIG. 1 is a schematic illustration showing one example of a structure of the vehicle to which the driving force control system of the present disclosure is applied and a control system of the vehicle.

Preferred embodiments of the present application will now be explained with reference to the accompanying drawings. Referring now to FIG. 1, there is schematically shown a structure of a vehicle to which the driving force control system according to the present disclosure is applied. As illustrated in FIG. 1, a prime mover of a vehicle Ve includes a first motor 1 and a second motor 2. As described later, the first motor 1 is incorporated into a first torque vectoring device 5. The first motor 1 and the first torque vectoring device 5 are arranged in a front part of the vehicle Ve to deliver output torque of the first motor 1 to a right front wheel 3R and a left front wheel 3L through the first torque vectoring device 5. Likewise, the second motor 2 is also incorporated into a second torque vectoring device 6. The second motor 2 and the second torque vectoring device 6 are arranged in a rear part of the vehicle Ve to deliver output torque of the second motor 2 to a right rear wheel 4R and a left rear wheel 4L through the second torque vectoring device 6. For example, a permanent magnet synchronous motor and an induction motor may be used as the first motor 1 and the second motor 2.

Specifically, the first torque vectoring device 5 is adapted to distribute the output torque of the first motor 1 to the right front wheel 3R and the left front wheel 3L while altering a distribution ratio. Likewise, the second torque vectoring device 6 is adapted to distribute the output torque of the second motor 2 to the right rear wheel 4R and the left rear wheel 4L while altering a distribution ratio.

The first torque vectoring device 5 comprises a differential mechanism 7, a brake device 8, a parking brake device 9, a differential motor 10, a limited slip differential 11, a first driveshaft 12 and a second driveshaft 13. Likewise, the second torque vectoring device 6 comprises a differential mechanism 14, a brake device 15, a parking brake device 16, a differential motor 17, a limited slip differential 18, a first driveshaft 19 and a second driveshaft 20.

Figure 2:
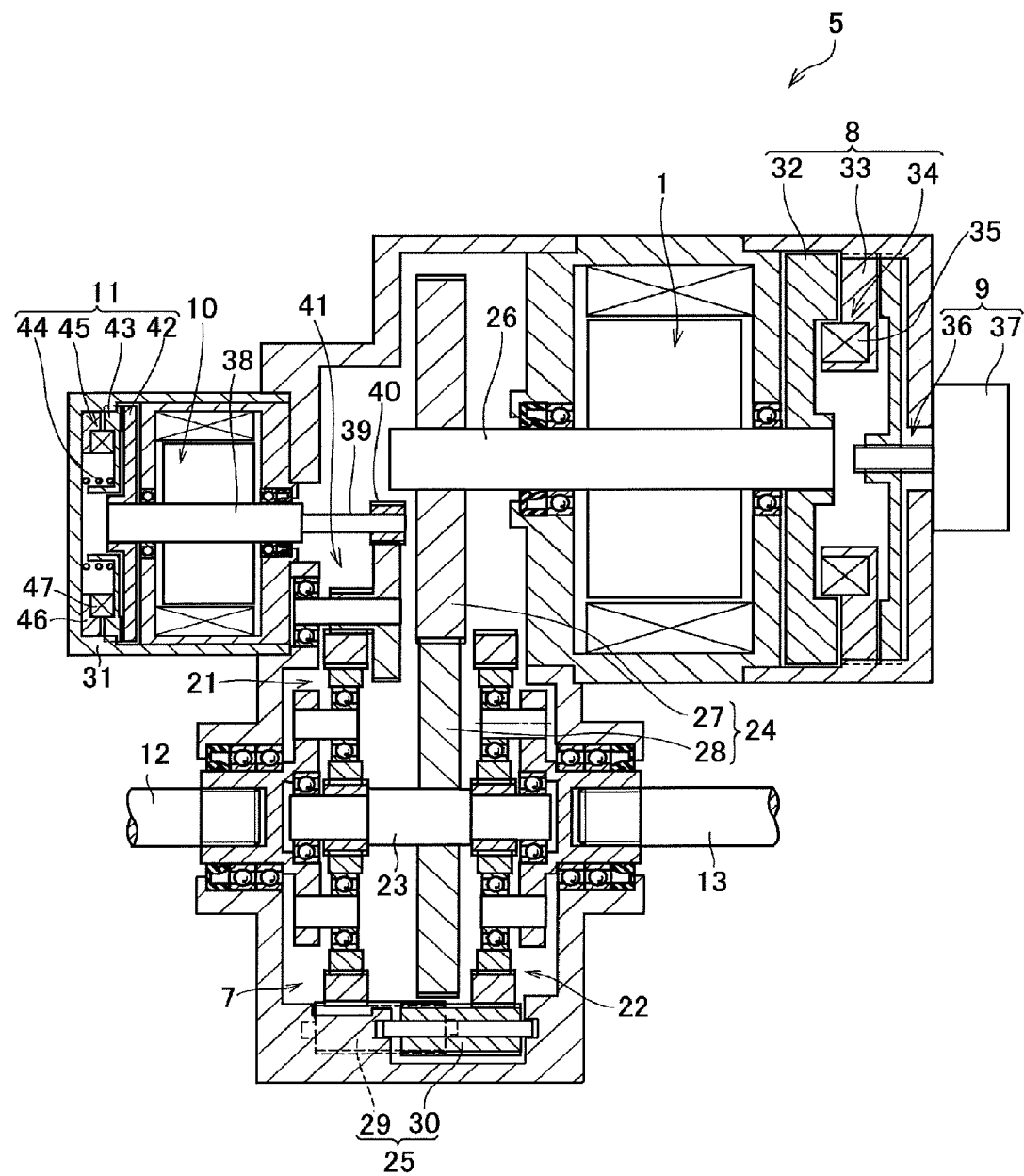
FIG. 2 is a cross-sectional view showing one example of a structure of a torque vectoring device used in the vehicle shown in FIG. 1.

Thus, structures of the first torque vectoring device 5 and the second torque vectoring device 6 are similar to each other, and the structure of the first torque vectoring device 5 is shown in FIG. 2 in more detail. A basic structure and an action of the torque vectoring device of this kind are also disclosed in Japanese patent application Nos. 2016-29050, 2016-22558, and 2015-253254 of the applicant of the present application.

In the first torque vectoring device 5, the differential mechanism 7 is adapted to distribute the output torque of the first motor 1 to the right front wheel 3R and the left front wheel 3L through the first driveshaft 12 and the second driveshaft 13. Specifically, the differential mechanism 7 comprises a first planetary gear unit 21, a second planetary gear unit 22, a connection shaft 23 connecting the first planetary gear unit 21 and the second planetary gear unit 22, a transmission mechanism 24 transmitting torque between the first motor 1 and the connection shaft 23, and a torque reversing mechanism 25 transmitting torque between the first planetary gear unit 21 and the second planetary gear unit 22 while reversing direction of the torque. Here, structures of the first planetary gear unit 21 and the second planetary gear unit 22 are identical to each other. In the first torque vectoring device 5, a single-pinion planetary gear unit having a sun gear, a ring gear and a carrier is individually used as the first planetary gear unit 21 and the second planetary gear unit 22.

In the first planetary gear unit 21, an output torque of the first motor 1 is applied to the sun gear through the transmission mechanism 24 and the connection shaft 23. The ring gear of the first planetary gear unit 21 is connected to the ring gear of the second planetary gear unit 22, and the carrier of the first planetary gear unit 21 is connected to the left front wheel 3L through the first driveshaft 12. On an outer circumference of the ring gear of the first planetary gear unit 21, outer teeth are formed to be meshed with a first pinion 29 of a below-mentioned torque reversing mechanism 25.

An output torque of the first motor 1 is also applied to the sun gear of the second planetary gear unit 22 through the transmission mechanism 24 and the connection shaft 23. The ring gear of the second planetary gear unit 22 is connected to the ring gear of the first planetary gear unit 21 through the torque reversing mechanism 25, and the carrier of the second planetary gear unit 22 is connected to the right front wheel 3R through the second driveshaft 13. On an outer circumference of the ring gear of the second planetary gear unit 22, outer teeth are also formed to be meshed with a second pinion 30 of the torque reversing mechanism 25.

The connection shaft 23 extends parallel to an output shaft 26 of the first motor 1 to connect the sun gear of the first planetary gear unit 21 to the sun gear of the second planetary gear unit 22. A driven gear 28 of the transmission mechanism 24 is fitted onto an intermediate portion of the connection shaft 23.

The transmission mechanism 24 comprises a drive gear 27 and a driven gear 28 to form a power transmission route between the output shaft 26 of the first motor 1 and the differential mechanism 7. Accordingly, the output torque of the first motor 1 is delivered to the connection shaft 23 through the transmission mechanism 24.

The torque reversing mechanism 25 comprises the first pinion 29 and the second pinion 30 to transmit torque between the ring gears of the first planetary gear unit 21 and the second planetary gear unit 22 while reversing a direction. The first pinion 29 extends parallel to the output shaft 26 and the connection shaft 23, and supported by a casing 31 of the first torque vectoring device 5 in a rotatable manner. According to the example shown in FIG. 2, a left part of the first pinion 29 is meshed with the outer teeth of the ring gear of the first planetary gear unit 21, and a right part of the first pinion 29 is meshed with a left part of the second pinion 30. Likewise, a right part of the second pinion 30 is meshed with the outer teeth of the ring gear of the second planetary gear unit 22, and the left part of the second pinion 30 is meshed with the right part of the first pinion 29.

The brake device 8 is an electromagnetic brake comprising a brake rotor 32 serving as a fixed magnetic pole, a brake stator 33 serving as a movable magnetic pole, and a brake solenoid 34. The brake rotor 32 is fitted onto the output shaft 26 of the first motor 1 to be rotated integrally therewith, and the brake stator 33 is engaged with an inner surface of the casing 31 while being allowed to reciprocate in an axial direction but restricted to rotate around the output shaft 26. The brake solenoid 34 includes a coil 35 that establishes magnetic attraction when energized to bring the brake stator 33 into frictional contact to the brake rotor 32 to generate brake torque for stopping the rotation of the brake rotor 32. That is, the torque vectoring device 5 is allowed to serve as an inboard brake by the brake device 8.

The parking brake device 9 comprises a feed screw mechanism 36 and a brake motor 37. The feed screw mechanism 36 is adapted to translate a rotary motion of the brake motor 37 into a linear motion thereby pushing the brake stator 33 toward the brake rotor 32 so as to bring the brake stator 33 into frictional contact to the brake rotor 32. That is, the feed screw mechanism 36 keeps the output shaft 26 stopping even if current supply to the brake device 8 is interrupted. Thus, in the parking brake device 9, the feed screw mechanism 36 generates forward thrust force by generating forward torque by the brake motor 37, and the forward thrust force is applied to the brake stator 33. Consequently, the brake stator 33 is frictionally engaged with the brake rotor 32 to halt the output shaft 26. By contrast, the output shaft 26 is allowed to rotate by generating a reverse torque by the brake motor 37 to withdraw the brake stator 33 from the brake rotor 32. That is, the braking force for stopping the rotation of the output shaft 26 is cancelled.

Specifically, reversed efficiency of the feed screw mechanism 36 to translate the linear motion into the rotational motion is adjusted to be lower than forward efficiency to translate the rotational motion into the linear motion. According to the preferred example, therefore, the output shaft 26 may be halted by pushing the brake stator 33 toward the brake rotor 32 by the feed screw mechanism 36 even if the current supply to the brake device 8 and the brake motor 37 is stopped. In the torque vectoring device 5, therefore, the brake torque may also be controlled by the parking brake device 9 instead of the brake device 8.

The differential motor 10 is an electric motor adapted to allow differential rotation between the right front wheel 3R and the left front wheel 3L by applying a differential torque to any of the rotary elements of the differential mechanism 7 thereby altering a torque split ratio from the first motor 1 to the right front wheel 3R and the left front wheel 3L. In the torque vectoring device shown in FIG. 2, a pinion 40 is fitted onto a leading end of an output shaft 39 integrated with a rotary shaft 38 of the differential motor 10 while connected to the outer teeth of the ring gear of the first planetary gear unit 21 through a counter gear 41. In the torque vectoring device 5, therefore, the torque delivered from the first motor 1 to one of the right front wheel 3R and the left front wheel 3L is increased and the torque delivered from the first motor 1 to the other of the right front wheel 3R and the left front wheel 3L is decreased by applying the differential torque of the differential motor 10 to the differential mechanism 7.

The limited slip differential 11 is adapted to limit differential rotation between the right front wheel 3R and the left front wheel 3L by applying a frictional braking force as a differential limit torque to any of the rotary elements of the differential mechanism 7. In the torque vectoring device shown in FIG. 2, the limited slip differential 11 is adapted to apply the limiting torque to the rotary shaft 38 of the differential motor 10. Specifically, the limited slip differential 11 is an electromagnetic brake that establishes a brake torque utilizing a spring force when it is not energized, and the brake torque is reduced by energizing the limited slip differential 11. The limited slip differential 11 comprises a differential rotation limiting solenoid 45 including a brake rotor 42, a brake stator 43 as a movable magnetic pole, and a compression coil spring 44. The brake rotor 42 is fitted onto the rotary shaft 38 to be rotated integrally therewith, and the brake stator 43 is engaged with an inner surface of the casing 31 while being allowed to reciprocate in an axial direction but restricted to rotate around the rotary shaft 38. In order to push the brake stator 43 toward the brake rotor 42, the compression coil spring 44 is interposed between the brake stator 43 and the casing 31. The differential rotation limiting solenoid 45 further includes an annular pedestal 46 as a fixed magnetic pole made of magnetic material that is fixed to the casing 31, and a coil 47 that establishes a magnetic attraction when energized.

In the limited slip differential 11, therefore, the brake stator 43 is pushed by the coil spring 44 to be frictionally engaged with the brake rotor 42 thereby stopping the rotation of brake rotor 42 integrated with the rotary shaft 38 when the differential rotation limiting solenoid 45 is not energized. That is, differential rotation in the differential mechanism 7 is limited in this situation. When the differential rotation limiting solenoid 45 is energized, the brake stator 43 is attracted to the pedestal 46 by the magnetic attraction established by the coil 47. In this situation, when the magnetic attraction of the coil 47 overwhelms the pushing force of the coil spring 44, the brake stator 43 is disengaged from the brake rotor 42 to cancel the limitation of differential rotation in the differential mechanism 7.

Turning back to FIG. 1, the vehicle Ve is provided with a battery 48 as a nickel hydride battery, a lithium-ion battery, a capacitor and so on. As shown in FIG. 1, the first motor 1, the brake solenoid 34 of the brake device 8, the differential motor 10, the differential rotation limiting solenoid 45 of the limited slip differential 11 are connected to the battery 48 through a first inverter 49 to deliver electricity thereto from the battery 48. Likewise, the second motor 2, a brake solenoid (not shown, similar to the brake solenoid 34) of the brake device 15, the differential motor 17, a differential rotation limiting solenoid (not shown, similar to the differential rotation limiting solenoid 45) of the limited slip differential 18 are also connected to the battery 48 through a second inverter 50 to deliver electricity thereto from the battery 48.

The first motor 1, the second motor 2, the brake devices 8 and 15, the differential motors 10 and 17, the differential limit torque $T_{LSD}$ are controlled integrally by a first controller (referred to as $1^{st}$-ECU" in FIG. 1) 51. On the other hand, the parking brake device 9 and 16 are controlled integrally by a second controller (referred to as $2^{nd}$-ECU" in FIG. 1) 52.

Figure 3:
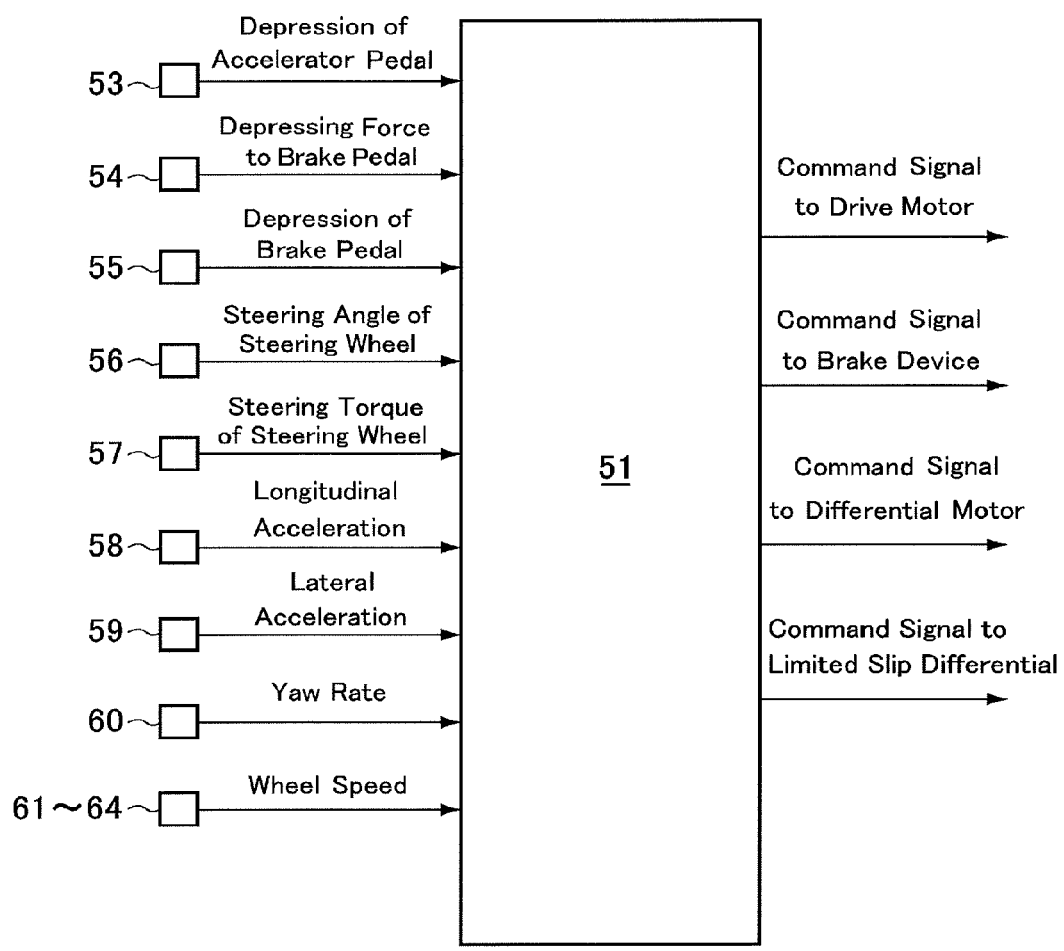
FIG. 3 is a block diagram showing functions of the first ECU.

Specifically, the first controller 51 is an electronic control unit composed mainly of a microcomputer, and data relating to an attitude of the vehicle Ve and details of driver's operations are sent to the first controller 51. For example, as shown in FIG. 3, the first controller 51 receives detection signals representing details of driver's operations from an accelerator sensor 53 for detecting a position of an accelerator pedal, a first brake sensor 54 for detecting a depressing force applied to a brake pedal, a second brake sensor 55 for detecting a depression of the brake pedal, a steering sensor 56 for detecting a steering direction and a steering angle of a steering wheel, and a steering torque sensor 57 for detecting a steering torque of the steering wheel. The first controller 51 also receives detection signals representing an attitude of vehicle Ve from a longitudinal acceleration sensor 58 for detecting longitudinal acceleration of the vehicle Ve, a lateral acceleration sensor 59 for detecting lateral acceleration of the vehicle Ve, a yaw rate sensor 60 for detecting a yaw rate of the vehicle Ve, a first wheel speed sensor 61 for detecting a speed of the right front wheel 3R, a second wheel speed sensor 62 for detecting a speed of the left front wheel 3L, a third wheel speed sensor 63 for detecting a speed of the right rear wheel 4R, and a fourth wheel speed sensor 64 for detecting a speed of the left rear wheel 4L.

The first controller 51 is configured to compute target values of vehicle behaviors based on the incident signals using formulas and maps installed therein, and to transmit command signals to the first inverter 49 and the second inverter 50 so as to control the first motor 1, the second motor 2, the brake devices 8 and 15, the differential motors 10 and 17, and the limited slip differentials 11 and 18. Specifically, the first controller 51 compute the control signals in such a manner as to execute an anti-lock brake control, a traction control, an electronic stability control, a dynamic yaw rate control and so on.

In order to supply electricity to the first controller 51 and control circuits of the first inverter 49 and the second inverter 50, the vehicle Ve is further provided with a first auxiliary battery 66 whose voltage is lower than that of the battery 48.

Figure 4:
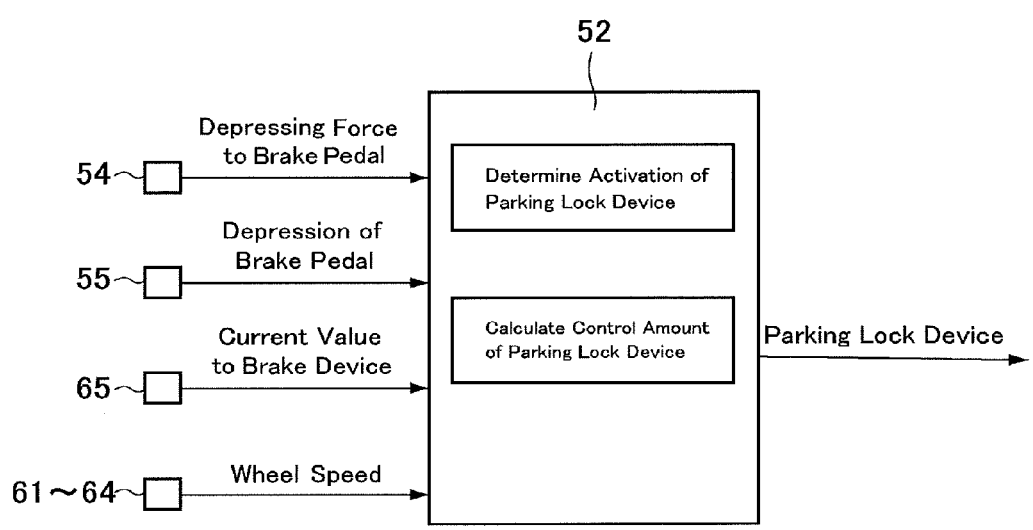
FIG. 4 is a block diagram showing functions of the second ECU.

The second controller 52 is also composed mainly of a microcomputer, and functions of the second controller 52 are shown in FIG. 4. In the event of electrical failure between the first controller 51 and the first auxiliary battery 66, or between the battery 48 and the first inverter 49 or the second inverter 50, the second controller 52 controls the parking brake device 9 and 16 to ensure braking force instead of the brake devices 8 and 15.

To this end, as shown in FIG. 4, signals representing an attitude of the vehicle Ve and details of driver's operations are also sent to the second controller 52. Specifically, the second controller 52 receives detection signals from the first brake sensor 54, the second brake sensor 55, and a brake current sensor 65 for detecting current values of the brake devices 8 and 15. Also, the signals representing vehicle behaviors such as direction signals of the wheel speed sensors 61 to 64 are sent to the second controller 52.

The second controller 52 is also configured to compute target values of control amounts of the parking brake device 9 and 16 based on the incident signals using formulas and maps installed therein, and to transmit command signals to the parking brake device 9 and 16. Specifically, the second controller 52 is configured to actuate the parking brake device 9 and 16 based on at least one of the following facts that: (i) the vehicle Ve has been parked longer than a predetermined period of time; (ii) a switch to actuate the parking brake device 9 and 16 is turned on; (iii) an ignition is turned off during parking; and (iv) at least any one of the brake devices 8 and 15 cannot be activated. The second controller 52 is further configured to calculate target brake torques to be achieved by the parking brake device 9 and 16 based on a depressing force and a depression of the brake pedal and speeds of the wheels 3R, 3L, 4R and 4L, and to supply current to the parking brake device 9 and 16 to achieve the calculated brake torques.

In order to supply electricity to the second controller 52 and the parking brake device 9 and 16 the vehicle Ve is further provided with a second auxiliary battery 67 whose voltage is also lower than that of the battery 48. The command signal may be transmitted between the first controller 51 and the second controller 52. For example, the second controller 52 is allowed to be operated in the event of failure of the first controller 51.

Figure 5:
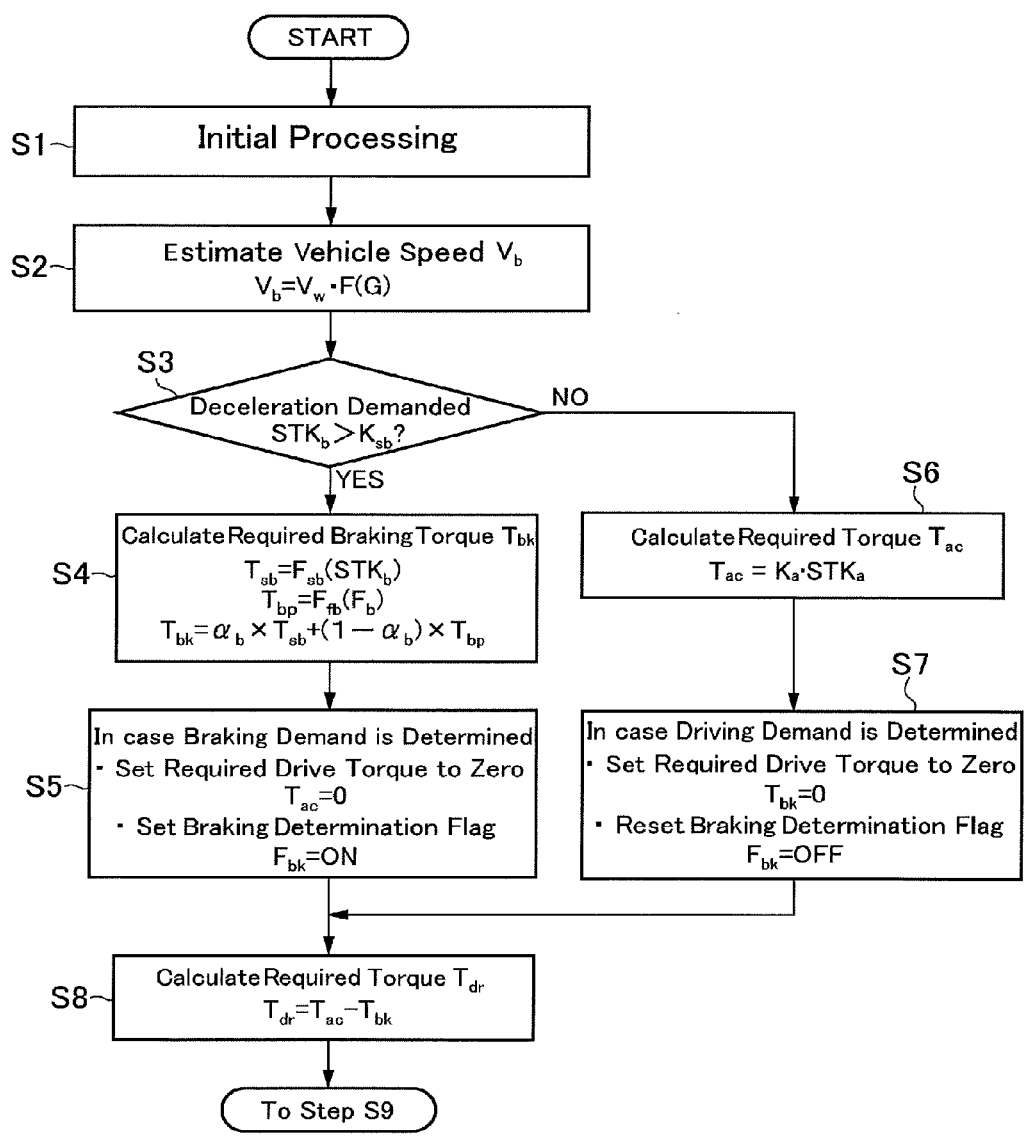
FIG. 5 is a flowchart showing steps S1 to S8 of the basic control executed by the driving force control system according to the present disclosure.

Here will be explained procedures of calculating current values to activate the first motor 1, the second motor 2, the differential motors 10 and 17, and brake devices 8 and 15 with reference to FIGS. 5 to 8, and the routines shown in FIGS. 5 to 8 are executed by the first controller 51. It is to be noted that the routines shown in FIGS. 5 to 8 may be executed consecutively, but will be explained separately for the sake of explanation. Turning now to FIG. 5, there is shown a routine for calculating a torque required by the driver. Specifically, drive torque for accelerating or decelerating the vehicle Ve is calculated by the routine shown in FIG. 5.

As an initial processing, the incident signals from the above-explained sensors 53, 54, 55, 56, 57, 58, 59, 60, 61, 62, 63, 64 and 65 are read at step S1. Then, a vehicle speed $V_b$ is estimated at step S2 using the following formula:

$$V_b = V_w \cdot F(G)$$

where "$V_w$" is a wheel speed and "$G$" is a longitudinal acceleration. To this end, not only an average speed of the wheels 3R, 3L, 4R and 4L but also any one of a speed of the wheels 3R, 3L, 4R and 4L may be employed as the wheel speed $V_w$.

Then, at step S3, a depression $STK_b$ of the brake pedal is compared to a predetermine threshold value $K_{sb}$ to determine whether or not the driver intends to decelerate the vehicle Ve. To this end, the threshold value $Ks_b$ may be determined based on an experimental result.

Figure 9:
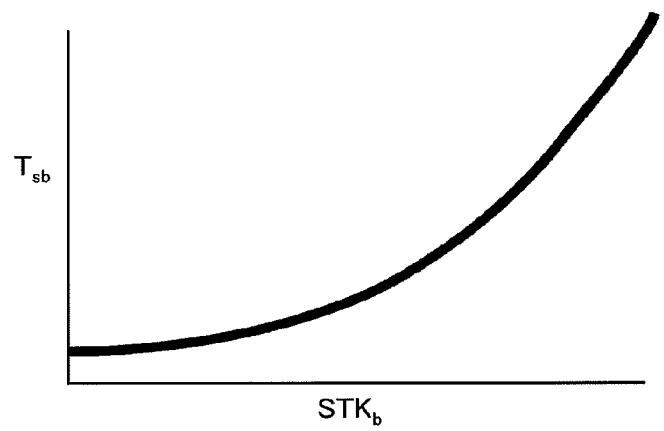
FIG. 9 is shows one example of a map for calculating brake torque based on a depression of a brake pedal.

If the depression $STK_b$ of the brake pedal is greater than the threshold value $K_{sb}$ so that the answer of step S3 is YES, the routine progresses to step S4 to calculate a brake torque $T_{bk}$ required by the driver. At step S4, first of all, a brake torque $T_{sb}$ based on the depression $STK_b$ of the brake pedal is obtained with reference to a map shown in FIG. 9. The map shown in FIG. 9 is prepared based on an experimental result, and as can be seen from FIG. 9, brake torque $T_{sb}$ is increased in a quadratic manner with an increase in the depression $STK_b$ of the brake pedal.

Figure 10:
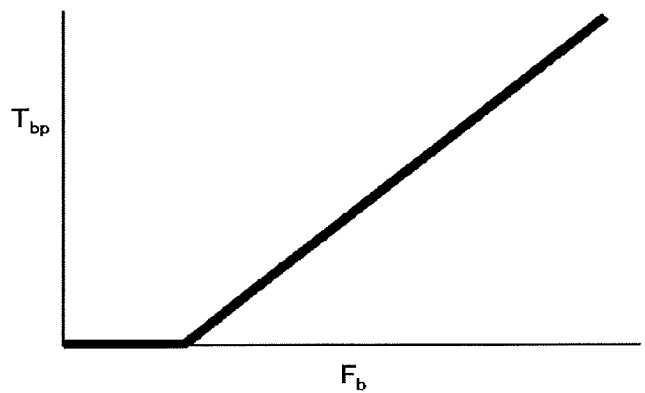
FIG. 10 shows one example of a map for calculating brake torque based on a depressing force applied to the brake pedal.

Then, a brake torque $T_{bp}$ based on a depressing force $F_b$ applied to the brake pedal is obtained with reference to a map shown in FIG. 10. The map shown in FIG. 10 is also prepared based on an experimental result. As can be seen from FIG. 10, the brake torque $Tb_p$ is set to zero until the depressing force $F_b$ applied to the brake pedal is increased to a predetermined value, and increased in proportion to an increase in the depressing force $F_b$ upon exceedance of the predetermined value.

Figure 11:
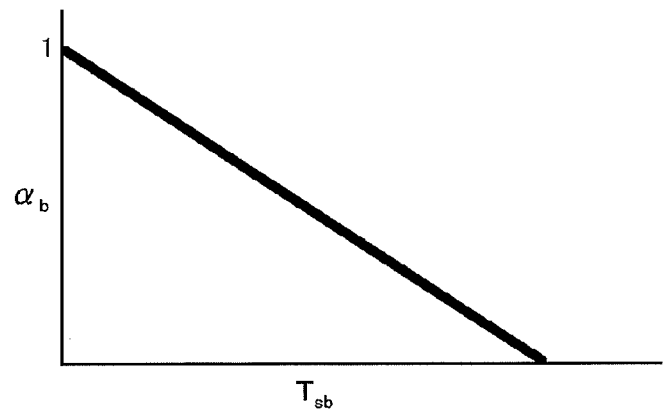
FIG. 11 shows one example of a map for calculating a contributing ratio of the brake torque based on a depression of a brake pedal.

Thereafter, the brake torque $T_{bk}$ required by the driver is calculated based on the brake torque $T_{sb}$ and the brake torque $T_{bp}$ using the following formula:

$$T_{bk} = \alpha_b \cdot T_{sb} + (1-\alpha_b) \cdot T_{bp}$$

where "$\alpha_b$" is a contributing ratio of the brake torque $T_{sb}$ to calculate the brake torque $T_{bk}$ required by the driver. To this end, the contributing ratio $\alpha_b$ is determined with reference to a map shown in FIG. 11. As can be seen from FIG. 11, the contributing ratio $\alpha_b$ is reduced in proportion to an increase in the brake torque $T_{sb}$.

In a case that the braking demand of the driver is thus determined, after calculating the brake torque $T_{bk}$ required by the driver, the routine progresses to step S5 to set a drive torque $T_{ac}$ required by the driver to "0", and to turn on a brake demand determination flag $F_{bk}$.

By contrast, if the depression $STK_b$ of the brake pedal is smaller than the threshold value $K_{sb}$ so that the answer of step S3 is NO, the routine progresses to step S6 to calculate the drive torque $T_{ac}$ required by the driver using the following formula:

$$T_{ac} = K_a \cdot STK_a$$

where "$K_a$" is a predetermined coefficient used to convert a depression $STK_a$ of the accelerator pedal into the drive torque $T_{ac}$ required by the driver.

In a case that the driving demand of the driver is thus determined, after calculating the drive torque $T_{ac}$ required by the driver, the routine progresses to step S7 to set the brake torque $T_{bk}$ required by the driver to "0", and to turn off the brake demand determination flag $F_{bk}$.

After thus calculating the brake torque $T_{bk}$ required by the driver or the drive torque $T_{ac}$ required by the driver, the routine progresses to step S8 to calculate a required torque $T_{dr}$ of the vehicle Ve using the following formula:

$$T_{dr} = T_{ac} - T_{bk}$$

Such calculation at step S8 is executed to calculate the torques for propelling in both forward and backward directions. To this end, at step S8, the torque to accelerate the vehicle Ve in the forward direction is set to a positive value, and the torque to decelerate the vehicle is converted into negative value. That is, since a value of the brake torque $T_{bk}$ calculated at step S4 is positive, the brake torque $T_{bk}$ is converted into a negative value at step S8.

After thus calculating the required torque $T_{dr}$ of the vehicle Ve, data relating to an attitude of the vehicle Ve such as a torque $T_{di\_r}$ to be delivered to the right wheels (i.e., a total torque delivered to the right front wheel 3R and the right rear wheel 4R), and a torque $T_{di\_l}$ to be delivered to the left wheels (i.e., a total torque delivered to the left front wheel 3L and the left rear wheel 4L) are calculated to improve running stability of the vehicle Ve during turning. To this end, the routine progresses to a routine shown in FIG. 6. Specifically, in order to carry out the electronic stability control and the dynamic yaw rate control, the torque $T_{di\_r}$ and the torque $T_{di\_l}$ are calculated based on an actual yaw rate detected by the yaw rate sensor 60.

Figure 6:
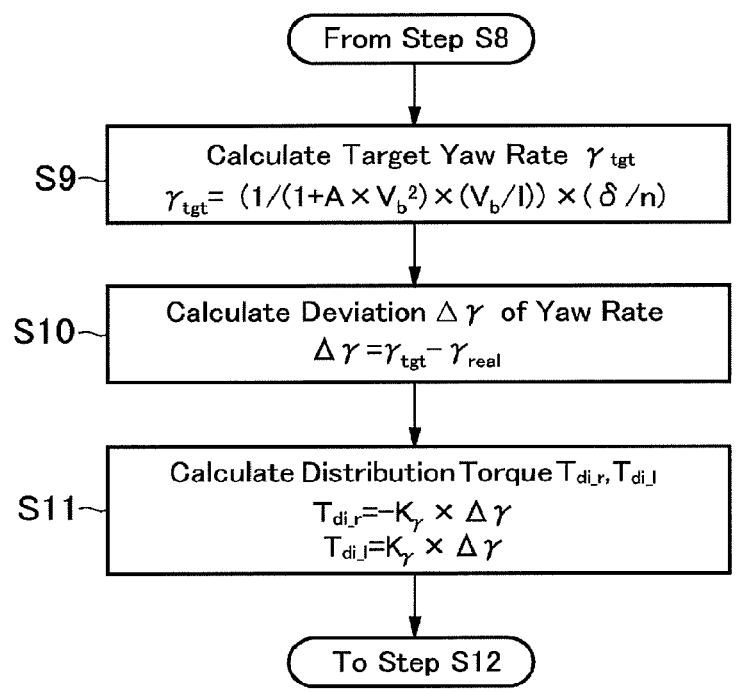
FIG. 6 is a flowchart showing steps S9 to S11 of the basic control executed by the driving force control system according to the present disclosure.

In the routine shown in FIG. 6, first of all, a target yaw rate $\gamma_{tgt}$ is calculated at step S9 based on a steering angle δ using the following formula:

$$\gamma_{tgt} = \{1/(1+A \cdot V_b^2) \cdot (V_b/l)\} \cdot (\delta/n)$$

where "A" is a stability factor, "l" is a wheel base, and "n" is a gear ratio of the steering wheel.

Then, a deviation Δγ between the target yaw rate $\gamma_{tgt}$ calculated at step S9 and an actual yaw rate $\gamma_{real}$ is calculated at step S10. Thereafter, in order to achieve the target yaw rate $\gamma_{tgt}$, the torque $T_{di\_r}$ to be delivered to the right wheels and the torque $T_{di\_l}$ to be delivered to the left wheels are calculated at step S11 using the following formulas:

$$T_{di\_r} = -K\gamma \cdot \Delta\gamma; \text{ and}$$

$$T_{di\_l} = K\gamma \cdot \Delta\gamma$$

where "Kγ" is a partition coefficient of the torque to be distributed to the right wheels and the left wheels that is stored in the first controller 51. Here, in the following description, the torque thus calculated at step S11 will be called the "distribution torque".

For example, when the torque vectoring device 5 shown in FIGS. 1 and 2 increases the torque delivered to the right front wheel 3R, the torque vectoring device 5 decreases the torque delivered to the left front wheel 3L in the same amount. At step S11, therefore, the torque $T_{di\_r}$ and the torque $T_{di\_l}$ are calculated in such a manner that the torques to be delivered to the right wheels and the left wheels are increased and decreased in the same amount.

Then, a current value $I_{m\_*}$ supplied to the motors 1 and 2, a current value $I_{s\_*}$ supplied to the differential motors 10 and 17, and a current value $I_{b\_*}$ supplied to the brake devices 8 and 15 are calculated based on the required torque $T_{dr}$ and the distribution torques $T_{di\_r}$ and $T_{di\_l}$. To this end, specifically, command drive torques $T_{wla\_}$ and command brake torques $T_{wlb\_}$ to the wheels 3R, 3L, 4R and 4L are calculated by a routine shown in FIG. 7, and the current values $I_{m\_*}$, $I_{s\_*}$ and $I_{b\_*}$ are calculated by a routine shown in FIG. 8.

Figure 7:
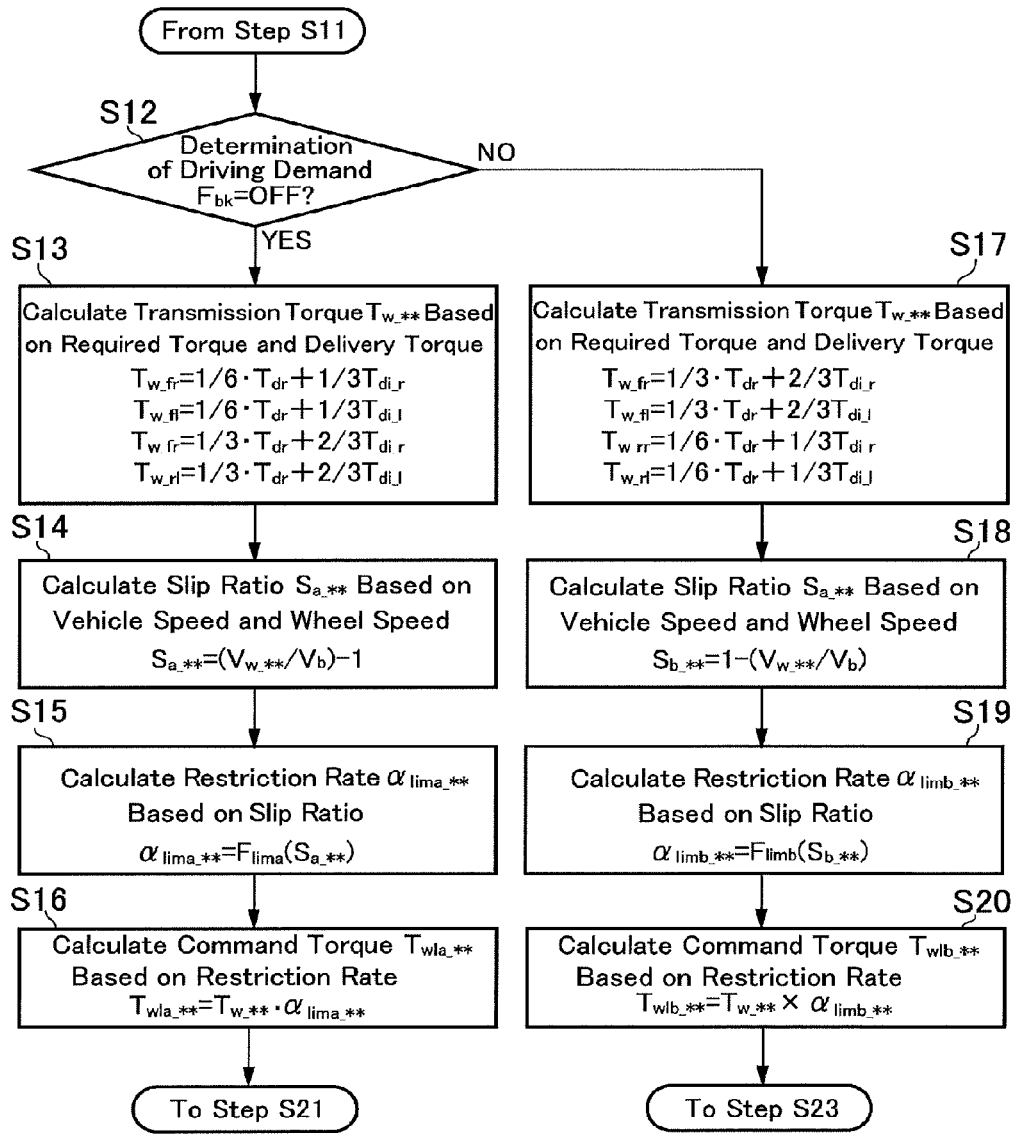
FIG. 7 is a flowchart showing steps S12 to S20 of the basic control executed by the driving force control system according to the present disclosure.

In the routine shown in FIG. 7, first of all, it is determined at step S12 whether or not the aforementioned brake demand determination flag $F_{bk}$ is turned off, in other words, it is determined whether or not the drive torque is required by the driver.

If the drive torque is required by the driver so that the answer of step S12 is YES, the routine progresses to step S13 to calculate a transmission torque to each of the wheel. At step S13, specifically, a transmission torque $T_{w\_fr}$ to the right front wheel 3R, a transmission torque $T_{w\_fl}$ to the left front wheel 3L, a transmission torque $T_{w\_rr}$ to the right rear wheel 4R, and a transmission torque $T_{w\_rl}$ to the left rear wheel 4L are individually calculated based on the required torque $T_{dr}$ calculated at step S8, and the torque $T_{di\_r}$ to be delivered to the right wheels and the torque $T_{di\_l}$ to be delivered to the left wheels, using the following formulas:

$$T_{w\_fr} = \tfrac{1}{6} T_{dr} + \tfrac{1}{3} T_{di\_r};$$

$$T_{w\_fl} = \tfrac{1}{6} T_{dr} + \tfrac{1}{3} T_{di\_l};$$

$$T_{w\_rr} = \tfrac{1}{3} T_{dr} + \tfrac{2}{3} T_{di\_r}; \text{ and}$$

$$T_{w\_rl} = \tfrac{1}{3} T_{dr} + \tfrac{2}{3} T_{di\_l}.$$

Here, when generating the drive torque, a larger vertical force is applied to each of the right rear wheel 4R and the left rear wheel 4L. In this case, therefore, a split ratio of the transmission torque $T_{w\_fr}$ to the right front wheel 3R to the transmission torque $T_{w\_rr}$ to the right rear wheel 4R is set to 1:2. Likewise, a split ratio of the transmission torque $T_{w\_fl}$ to the left front wheel 3L to the transmission torque $T_{w\_rl}$ to the left rear wheel 4L is set to 1:2. However, the split ratio of the transmission torque to the front wheel to the transmission torque to the rear wheel may be adjusted according to need.

Then, a slippage of each wheel caused by generating the drive torque is detected at step S14. At step S14, specifically, a slip ratio $S_{a\_}$ of each of the right front wheel 3R, the left front wheel 3L, the right rear wheel 4R and the left rear wheel 4L is individually calculated based on the vehicle speed $V_b$ and the wheel speed $V_{w\_}$ of each of the wheel 3R, 3L, 4R and 4L, using the following formula:

$$S_{a\_} = (V_{w\_}/V_b) - 1.$$

Here, although only a common formula using a common symbol "" representing all of the wheels is indicated above, the slip ratio of each of the wheel is individually calculated. Also, in the following description, only common formulas using the common symbol "" to be used to calculate parameters of the wheels at the following steps will be explained for the sake of convenience, and the common symbol "**" will be used to represent all of the wheels.

Figure 12:
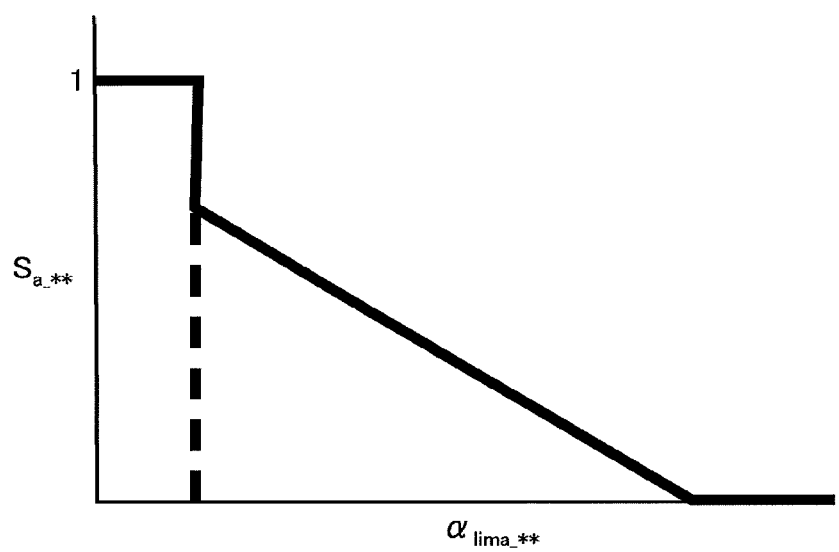
FIG. 12 shows one example of a map for calculating a limit ratio of torque based on a slip ratio during propulsion.

Then, in order to execute the traction control, that is, in order to prevent an excessive delivery of the drive torque to the wheel slipping at the high slip ratio $S_{a\_}$, a limit rate $\alpha_{lima\_}$ of the transmission torque to each of the wheel is calculated at step S15. Specifically, at step S15, the limit rate $\alpha_{lima\_}$ of the transmission torque to each of the right front wheel 3R, the left front wheel 3L, the right rear wheel 4R and the left rear wheel 4L is individually calculated based on the slip ratio $S_{a\_}$ calculated at step S14 with reference to a map shown in FIG. 12. To this end, the map shown in FIG. 12 is prepared based on an experimental result, and stored in the first controller 51. As can be seen from FIG. 12, the limit rate $\alpha_{lima\_}$ is set to a constant value in a case that the slip ratio $S_{a\_}$ is greater than a predetermined value. By contrast, in a case that the slip ratio $S_{a\_}$ is smaller than the predetermined value, the limit rate $\alpha_{lima\_}$ is increased with a reduction in the slip ratio $S_{a\_**}$.

Thereafter, a command torque $T_{wla\_}$ to each of the right front wheel 3R, the left front wheel 3L, the right rear wheel 4R and the left rear wheel 4L is individually calculated at step S16 based on the transmission torque $T_{w\_}$ calculated at step S13 and the limit rate $\alpha_{lima\_}$ calculated at step S15**, using the following formula:

$$T_{wla\_} = T_{w\_} \cdot \alpha_{lima\_**}.$$

By contrast, if the brake demand determination flag $F_{bk}$ is turned on so that the answer of step S12 is NO, the routine progresses to step S17 to calculate the transmission torques $T_{w\_fr}$, $T_{w\_fl}$, $T_{w\_rr}$, and $T_{w\_rl}$, to the wheel 3R, 3L, 4R and 4L based on the required torque $T_{dr}$ calculated at step S8, and the torques $T_{di\_r}$ and the torque $T_{di\_l}$ calculated at step S11, using the following formulas:

$$T_{w\_fr} = \tfrac{1}{3} T_{dr} + \tfrac{2}{3} T_{di\_r};$$

$$T_{w\_fl} = \tfrac{1}{3} T_{dr} + \tfrac{2}{3} T_{di\_l};$$

$$T_{w\_rr} = \tfrac{1}{6} T_{dr} + \tfrac{1}{3} T_{di\_r}; \text{ and}$$

$$T_{w\_rl} = \tfrac{1}{6} T_{dr} + \tfrac{1}{3} T_{di\_l}.$$

In this case, a brake torque is to be generated at step S17. That is, contrary to step S13, a larger vertical force is applied to each of the right front wheel 3R and the left front wheel 3L. In this case, therefore, the split ratio of the transmission torque $T_{w\_fr}$ to the right front wheel 3R to the transmission torque $T_{w\_rr}$ to the right rear wheel 4R is set to 2:1. Likewise, the split ratio of the transmission torque $T_{w\_fl}$ to the left front wheel 3L to the transmission torque $T_{w\_rl}$ to the left rear wheel 4L is set to 2:1. However, the split ratio of the transmission torque to the front wheel to the transmission torque to the rear wheel may be adjusted according to need.

Then, at step S18, a slippage of each wheel caused by generating the brake torque is detected at step S18. At step S18, specifically, a slip ratio $S_{b\_}$ of each of the right front wheel 3R, the left front wheel 3L, the right rear wheel 4R and the left rear wheel 4L is individually calculated based on the vehicle speed $V_b$ and the wheel speed $V_{w\_}$ of each of the wheel 3R, 3L, 4R and 4L, using the following formula:

$$S_{b\_}=1-(V_{w\_}/V_b).$$

Figure 13:
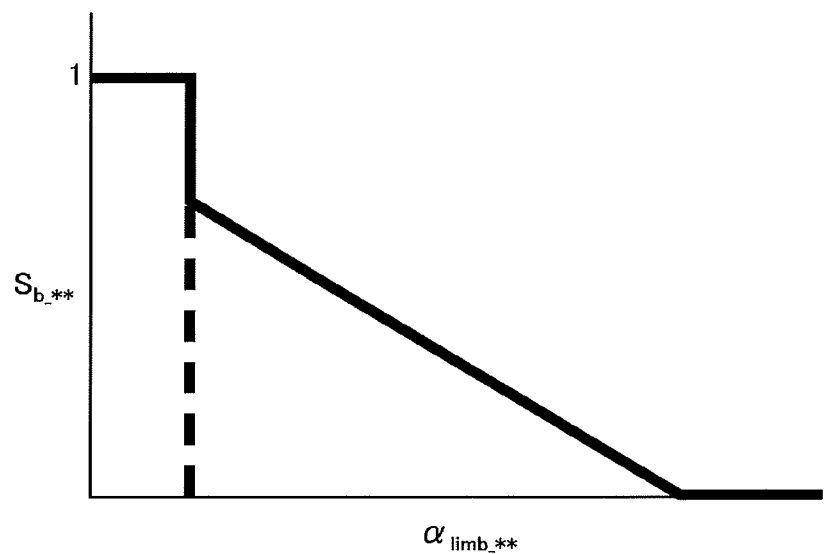
FIG. 13 shows one example of a map for calculating a limit ratio of torque based on a slip ratio during braking.

Then, in order to execute the anti-lock brake control, that is, in order to prevent an excessive delivery of the brake torque to the wheel slipping at the high slip ratio $S_{b\_}$, a limit rate $\alpha_{limb\_}$ of the transmission torque to each of the wheel is calculated at step S19. Specifically, at step S19, the limit rate $\alpha_{limb\_}$ of the transmission torque to each of the right front wheel 3R, the left front wheel 3L, the right rear wheel 4R and the left rear wheel 4L is individually calculated based on the slip ratio $S_{b\_}$ calculated at step S18 with reference to a map shown in FIG. 13. To this end, the map shown in FIG. 13 is prepared based on an experimental result, and stored in the first controller 51. As can be seen from FIG. 13, the limit rate $\alpha_{limb\_}$ is also set to a constant value in a case that the slip ratio $S_{b\_}$ is greater than a predetermined value. By contrast, in a case that the slip ratio $S_{b\_}$ is smaller than the predetermined value, the limit rate $\alpha_{limb\_}$ is also increased with a reduction in the slip ratio $S_{b\_**}$.

Thereafter, a command torque $T_{wlb\_}$ to each of the right front wheel 3R, the left front wheel 3L, the right rear wheel 4R and the left rear wheel 4L is individually calculated at step S20 based on the transmission torque $T_{w\_}$ calculated at step S17 and the limit rate $\alpha_{limb\_**}$ calculated at step S19, using the following formula:

$$T_{wlb\_}=T_{w\_}\cdot\alpha_{limb\_**}.$$

Thus, in the case of generating the drive torque, the transmission torque $T_{w\_}$ to each of the right front wheel 3R, the left front wheel 3L, the right rear wheel 4R and the left rear wheel 4L is individually calculated at step S13, and the command torque $T_{wla\_}$ to each wheel is individually calculated by multiplying the transmission torque $T_{w\_}$ by the limit rate $\alpha_{lima\_}$. That is, the transmission torque $T_{w\_}$ is corrected based on the slip ratio $S_{a\_}$. Likewise, in the case of generating the brake torque, the transmission torque $T_{w\_}$ to each of the right front wheel 3R, the left front wheel 3L, the right rear wheel 4R and the left rear wheel 4L is individually calculated at step S17, and the command torque $T_{wlb\_}$ to each wheel is individually calculated by multiplying the transmission torque $T_{w\_}$ by the limit rate $\alpha_{limb\_}$. That is, the transmission torque $T_{w\_}$ is corrected based on the slip ratio $S_{b\_}$.

Then, the current value $I_{m\_*}$ supplied to each of the motors 1 and 2, the current value $I_{s\_*}$ supplied to each of the differential motors 10 and 17, and the current value $I_{b\_*}$ supplied to each of the brake devices 8 and 15 are calculated based on the command torque $T_{wla\_**}$ calculated at step S16. In the case of generating the drive torque, the current value $I_{m\_*}$ supplied to each of the motors 1 and 2, and the current value $I_{s\_*}$ supplied to each of the differential motors 10 and 17 are calculated at step S21 based on the command torque $T_{wla\_**}$ calculated at step S16, using the following formulas:

$$I_{m\_*}=K_{Ima}\cdot(T_{wla\_*r}+T_{wla\_*l}); \text{ and}$$

$$I_{s\_*}=F_{LSD}\cdot(T_{wla\_*r},T_{wla\_*l}),$$

where $K_{Ima}$ is a transmission constant to transform the required torques of the drive motor 1 and the drive motor 2 into the current values, that is stored in the first controller 51. In the above formulas, "*" represents both of the front wheel and the rear wheel. Specifically, the current value $I_{m\_*}$ to the first motor 1 is calculated by adding the command torques to the right front wheel 3R and the left front wheel 3L, and multiplying the total command torque by the constant $K_{Ima}$. Likewise, the current value $I_{m\_*}$ to the second motor 2 is calculated by adding the command torques to the right rear wheel 4R and the left rear wheel 4L, and multiplying the total command torque by the constant $K_{Ima}$.

In the above-mentioned formula, "$F_{LSD}$" is a function used to calculate current values supplied to the differential motors 10 and 17. Specifically, the current values $I_{s\_*}$ supplied to the differential motors 10 and 17 are calculated based on the function $F_{LSD}$ using the command torque $T_{wla\_*r}$ to the right front wheel 3R and the command torque $T_{wla\_*l}$ to the left front wheel 3L as parameters. As described, the routines shown in the foregoing flowcharts are executed in the vehicle Ve having the torque vectoring devices 5 and 6 individually including the limited slip differentials 11 and 18. Accordingly, the first controller 51 is configured to selectively allow and limit differential rotation of each of the torque vectoring devices 5 and 6 using the limited slip differentials 11 and 18. To this end, the current values $I_{s\_*}$ supplied to the differential motors 10 and 17 are set in the function $F_{LSD}$ taking account of operations of the limited slip differentials 11 and 18. That is, the first controller 51 controls the differential motors 10 and 17 and the limited slip differentials 11 and 18 cooperatively. For this purpose, the current values $I_{s\_*}$ supplied to the differential motors 10 and 17 are calculated by the routines shown in figures subsequent to FIG. 14.

Thereafter, at step S22, the currents based on the current values $I_{m\_*}$ and $I_{s\_*}$ thus calculated at step S21 are supplied to the first motor 1 and the second motor 2, and to the differential motors 10 and 17.

By contrast, in the case that the driver intends to decelerate the vehicle Ve so that the answer of step S12 is NO, a total brake torque $T_{wlb}$ is calculated at step S23 by adding command torques $T_{wla\_fr}$ to the right front wheel 3R, $T_{wla\_fl}$ to the left front wheel 3L, $T_{wla\_rr}$ to the right rear wheel 4R, and $T_{wla\_rl}$ to the left rear wheel 4L.

Then, at step S24, it is determined whether or not the total brake torque $T_{wlb}$ calculated at step S23 can be generated by the first motor 1 and the second motor 2. Specifically, it is determined whether or not the total brake torque $T_{wlb}$ can be generated by regenerating energy by the first motor 1 and the second motor 2 as expressed by the following inequality:

$$T_{wlb}>T_{kai}$$

where $T_{kai}$ is a maximum value of a regenerative torque possible to generate electricity by the first motor 1 and the second motor 2 while generating a brake torque. That is, the $T_{kai}$ is governed by capacities of the first motor 1 and the second motor 2.

If the total brake torque $T_{wlb}$ is greater than the maximum regenerative torque $T_{kai}$ of the first motor 1 and the second motor 2 so that the answer of step S24 is YES, the first motor 1 and the second motor 2 are operated to generate maximum regenerative torque, and a shortage of the brake torque to the total brake torque $T_{wlb}$ is generated by the brake devices 8 and 15. To this end, at step S25, the current value $I_{m\_*}$ supplied to each of the drive motors 1 and 2, the current value $I_{b\_*}$ supplied to each of the brake devices 8 and 15, and the current value $I_{s\_*}$ supplied to each of the differential motors 10 and 17 are calculated using the following formulas:

$$I_{m\_*} = K_{Ima} \cdot (T_{kai}/2);$$

$$I_{b\_*} = K_{Ib} \cdot (T_{wlb\_*r} + T_{wlb\_*l} - T_{kai}/2); \text{ and}$$

$$I_{s\_*} = F_{LSD}(T_{wlb\_*r}, T_{wlb\_*l}),$$

where $K_{Ima}$ is a transmission constant to translate the required torques of the first motor 1 and the second motor 2 into the current values, that is also stored in the first controller 51. Specifically, as the procedures to calculate the current values $I_{m\_*}$ to the first motor 1 the second motor 2 at step S21, the current values $I_{b\_*}$ to the brake devices 8 and 15 are calculated based on the total of the command torques to the right front wheel 3R and the left front wheel 3L, and the total of the command torques to the right rear wheel 4R and the left rear wheel 4L. At step S25, the aforementioned function $F_{LSD}$ is also used to calculate the current values supplied to the differential motors 10 and 17. Specifically, the current values $I_{s\_*}$ supplied to the differential motors 10 and 17 are calculated based on the function $F_{LSD}$ using the command torque $T_{wla\_*r}$ to the right front wheel 3R and the command torque $T_{wla\_*l}$ to the left front wheel 3L as parameters. Details of procedures to calculate the current values $I_{s\_*}$ supplied to the differential motors 10 and 17 will also be explained with reference to figures subsequent to FIG. 14.

Thereafter, at step S22, the currents based on the current values $I_{m\_*}$, $I_{b\_*}$ and $I_{s\_*}$ thus calculated at step S26 are supplied to the drive motor 1 and the drive motor 2, to the brake devices 8 and 15, and to the differential motors 10 and 17.

By contrast, if the total brake torque $T_{wlb}$ is smaller than the maximum regenerative torque $T_{kai}$ of the first motor 1 and the second motor 2 so that the answer of step S24 is NO, the current value $I_{m\_*}$ supplied to each of the drive motors 1 and 2, and the current value $I_{s\_*}$ supplied to each of the differential motors 10 and 17 are calculated based on and the command torque $T_{wlb\_*}$ calculated at step S20 using the following formulas:

$$I_{m\_*} = K_{Imb} \cdot (T_{wlb\_*r} + T_{wlb\_*l}); \text{ and}$$

$$I_{s\_*} = F_{LSD}(T_{wlb\_*r}, T_{wlb\_*l}),$$

where $K_{Imb}$ is a transmission constant to translate the required torques of the first motor 1 and the second motor 2 into the current values that is also stored in the first controller 51, and $F_{LSD}$ is a function used to calculate the current values supplied to the differential motors 10 and 17. Specifically, the current values $I_{s\_*}$ supplied to the differential motors 10 and 17 are calculated based on the function $F_{LSD}$ using the command torque $T_{wlb\_*r}$ to the right front wheel 3R and the command torque $T_{wlb\_*l}$ to the left front wheel 3L as parameters. As described, details of procedures to calculate the current values $I_{s\_*}$ supplied to the differential motors 10 and 17 will also be explained with reference to figures subsequent to FIG. 14.

Thus, according to the routines shown in FIGS. 5 to 8, the current values $I_{m\_*}$ supplied to the first motor 1 and the second motor 2, and the current values $I_{s\_*}$ supplied to the differential motors 10 and 17 are calculated based on the slip ratios $S_{a\_}$ and $S_{b\_}$ of each of the right front wheel 3R, the left front wheel 3L, the right rear wheel 4R and the left rear wheel 4L. According to the preferred embodiment, therefore, even if the torque split ratio is changed and hence the torque of one of the right and left wheels is changed, the torque of the other wheel will not be increased or decreased excessively. For this reason, running stability of the vehicle Ve can be improved.

In the case that the total brake torque $T_{wlb}$ can be established by the first motor 1 and the second motor 2, the current values $I_{m\_*}$ to the first motor 1 the second motor 2 are controlled in such a manner as to establish the total brake torque $T_{wlb}$ only by the first motor 1 and the second motor 2. For this reason, an energy regeneration efficiency can be improved. By contrast, even if the total brake torque $T_{wlb}$ cannot be established only by the first motor 1 and the second motor 2, the current value $I_{m\_*}$ is controlled in such a manner as to establish the maximum regenerative torque by the first motor 1 and the second motor 2, and to establish the shortage of the brake torque to the total brake torque $T_{wlb}$ by the brake devices 8 and 15. That is, the energy regeneration efficiency can be improved while reducing the brake torques to be established by the brake devices 8 and 15. For this reason, the brake devices 8 and 15 can be downsized, or damages on the brake devices 8 and 15 can be limited.

During turning of the vehicle Ve, the distribution torques $T_{di\_r}$ to the right wheels and the distribution torque $T_{di\_l}$ to the left wheels are calculated at step S11 in such a manner that the torques to be delivered to the right wheels and the left wheels are increased and decreased in the same amount. For this reason, turning performance of the vehicle Ve can be improved without reducing longitudinal acceleration.

As described, the first controller 51 is configured to selectively allow and limit differential rotation of each of the torque vectoring devices 5 and 6 using the limited slip differentials 11 and 18. That is, the first controller 51 controls the differential motors 10 and 17 and the limited slip differentials 11 and 18 cooperatively. To this end, specifically, the current values $I_{s\_*}$ supplied to the differential motors 10 and 17 are calculated at the foregoing steps S21, S25 and S26 using the subroutines shown in FIGS. 14 and 15.

Figure 14:
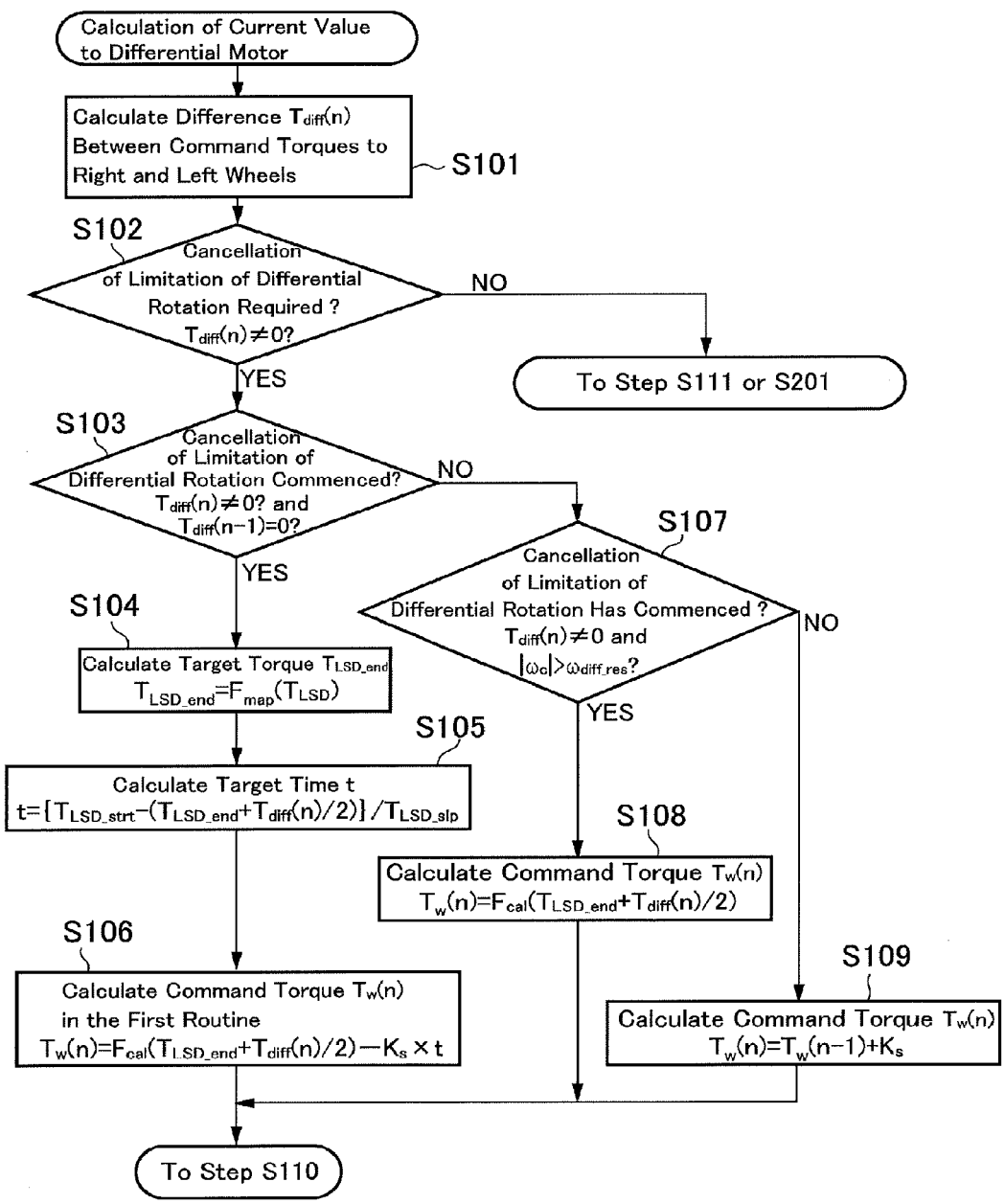
FIG. 14 is a flowchart showing steps S101 to S109 of a subroutine for calculating a current value $I_{s\_*}$ to the differential motor executed at steps S21, S25 and S26 in the routine shown in FIG. 8.

In the routine shown in FIG. 14, at step S101, a difference $T_{diff}(n)$ between the command torques to the right front wheel 3R, and the left front wheel 3L and a difference $T_{diff}(n)$ between the command torques to the right rear wheel 4R and the left rear wheel 4L are calculated the following formula:

$$T_{diff}(n) = T_{wlb\_*r}, T_{wlb\_*l}$$

where "$T_{diff}(n)$" is a current value of the difference $T_{diff}$. That is, the difference $T_{diff}$ calculated in a previous routine is expressed as "$T_{diff}(n-1)$". In the above formula, "*" also represents both of the front wheel and the rear wheel. Specifically, $T_{wlb\_*r}$ represents a total of the calculated command torques (including both drive torque and brake torque) to the right front wheel 3R and the left front wheel 3L, and $T_{wlb\_*l}$ represents a total of the calculated command torques to the right rear wheel 4R and the left rear wheel 4L.

Then, it is determined at step S102 whether or not the limitation of differential rotation is cancelled in the torque vectoring devices 5 and 6. At step S102, specifically, it is determined whether or not the difference $T_{diff}(n)$ between the command torques to the right wheel and the left wheel calculated at step S101 is 0. As described, the torque vectoring devices 5 and 6 individually includes the limited slip differentials 11 and 18 adapted to reduce a braking force established by the coil spring 44 by a magnetic attraction established when the coil 47 is energized. That is, when the limited slip differentials 11 and 18 are not energized, the torque vectoring devices 5 and 6 are brought into differential limit mode to be restricted to perform differential rotation. By contrast, when the limited slip differentials 11 and 18 are energized, the torque vectoring devices 5 and 6 are brought into differential mode to be allowed to perform differential rotation. When limiting differential rotations in the torque vectoring devices 5 and 6, the command torques to the right wheel and the left wheel are adjusted in such a manner that the difference $T_{diff}(n)$ is reduced to 0. At step S102, therefore, the first controller 51 determines a fact that a cancellation of the limitation of differential rotation in the torque vectoring devices 5 and 6 is required, or that the torque vectoring devices 5 and 6 are in condition to cancel the limitation of differential rotation. Here, although the torque vectoring devices 5 and 6 can be controlled independently, an example of controlling the torque vectoring devices 5 and 6 cooperatively will be explained in the following description.

If the difference $T_{diff}(n)$ between the command torques to the right wheel and the left wheel is not 0, that is, if a cancellation of the limitation of differential rotation in the torque vectoring devices 5 and 6 is required so that the answer of step S102 is YES, the routine progresses to step S103 to determine a commencement of the control for cancelling the limitation of differential rotation in the torque vectoring devices 5 and 6. In other words, it is determined whether or not the current routine is the first routine to cancel the limitation of differential rotation in the torque vectoring devices 5 and 6. At step S103, specifically, it is determined whether or not the difference $T_{diff}(n)$ between the command torques to the right wheel and the left wheel in the current routine is not 0 but the difference $T_{diff}(n-1)$ between the command torques to the right wheel and the left wheel in the previous routine was 0. If the difference $T_{diff}(n-1)$ in the previous routine was 0 and the difference $T_{diff}(n)$ in the current routine is not 0, the first controller 51 determines a commencement of the first routine to cancel the limitation of differential rotation in the torque vectoring devices 5 and 6.

Figure 16:
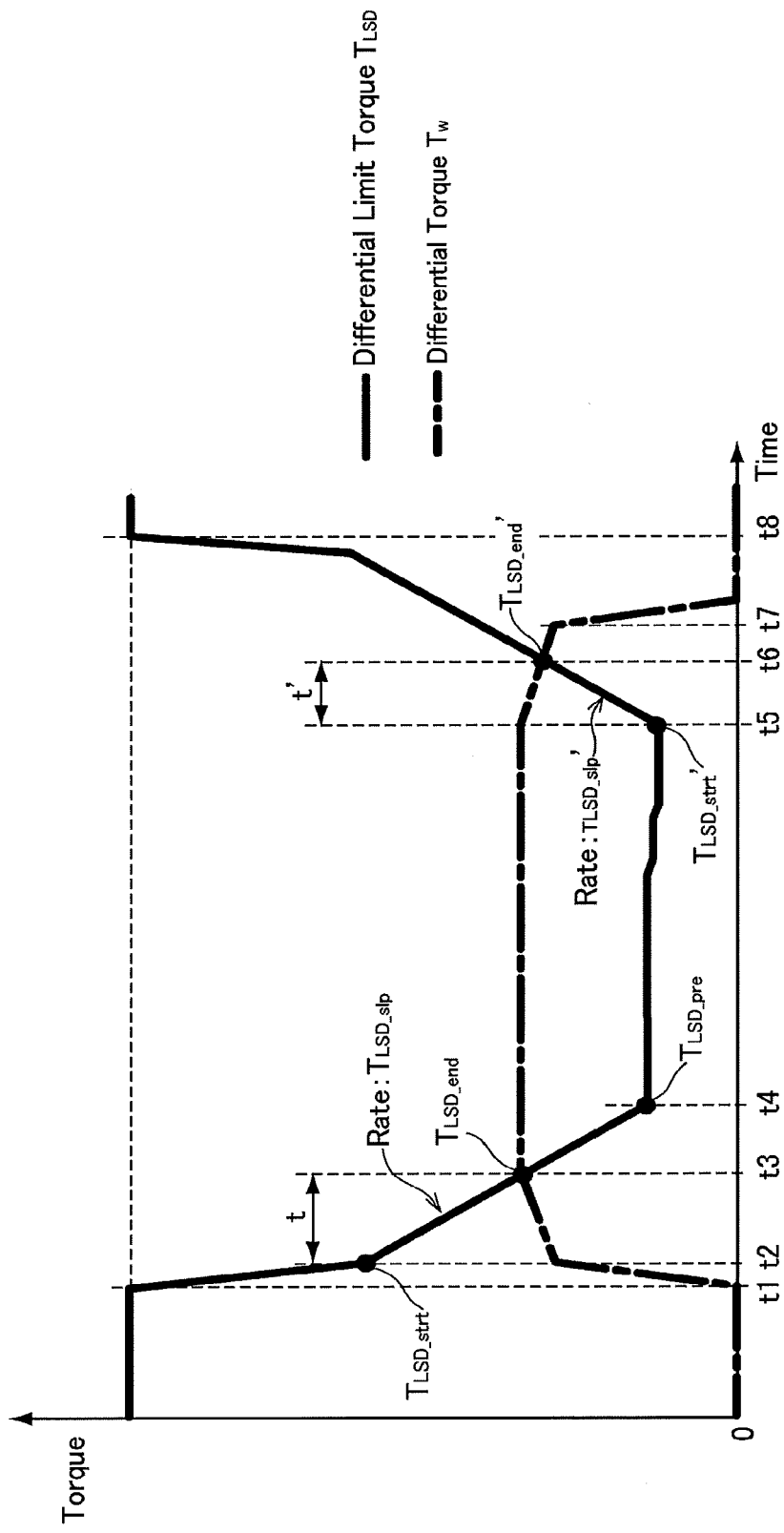
FIG. 16 is a time chart indicating changes in the differential limit torque $T_{LSD}$ and the differential torque $T_w$ during execution of the routine shown in FIGS. 14 and 15.
Figure 17:
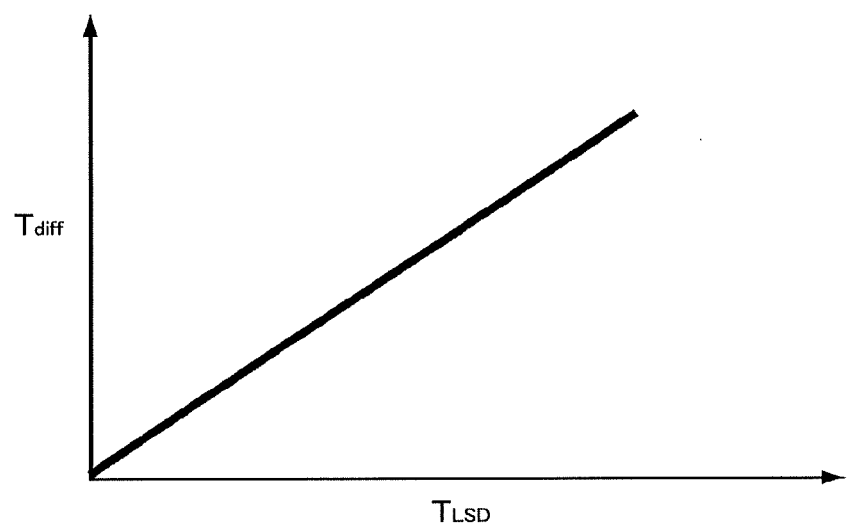
FIG. 17 shows one example of a map for calculating a target torque $T_{LSD\_end}$ during execution of the routine shown in FIGS. 14 and 15.

If the commencement of the first routine to cancel the limitation of differential rotation in the torque vectoring devices 5 and 6 is determined so that the answer of step S103 is YES, the routine progresses to step S104 to calculate a target torque $T_{LSD\_end}$ of a command torque $T_{LSD}$ to each of the limited slip differentials 11 and 18 to cancel the limitation of differential rotation in the torque vectoring devices 5 and 6, in other words, to allow the torque vectoring devices 5 and 6 to perform differential rotation. The target torque $T_{LSD\_end}$ is also a target value of a command torque $T_w$ to each of the differential motors 10 and 17. As indicated in FIG. 16, in the case of allowing the torque vectoring devices 5 and 6 to perform differential rotation, the command torque $T_{LSD}$ to each of the limited slip differentials 11 and 18 is reduced gradually from the torque limiting the differential rotation in the torque vectoring device 5 and 6, and the command torque $T_w$ to the differential motors 10 and 17 is increased gradually from 0. Then, when the command torque $T_w$ (i.e., a differential torque) to the differential motors 10 and 17 coincides with the command torque $T_{LSD}$ (i.e., a differential limit torque) to the limited slip differentials 11 and 18 at an end point of a required time "t" to cancel the limitation of differential rotation where a difference between the differential limit torque $T_{LSD}$ and the differential torque $T_w$ is zero, the torque vectoring devices 5 and 6 are allowed to start differential rotation. At step S104, specifically, the target torque $T_{LSD\_end}$ is calculated using the following formula:

$$T_{LSD\_end}=F_{map}(T_{LSD})$$

where "$F_{map}(T_{LSD})$" is a function to calculate the target torque $T_{LSD\_end}$. The function $F_{map}(T_{LSD})$ may be prepared in the form of a map shown in FIG. 17 in which a diagonal line represents a value at which the difference $T_{diff}$ that is, the differential torque $T_w$ coincides with the differential limit torque $T_{LSD}$.

Then, the required time t to complete the cancellation of the limitation of differential rotation in the torque vectoring devices 5 and 6 is determined at step S105 based on the target torque $T_{LSD\_end}$, a starting torque $T_{LSD\_strt}$ of the differential limit torque $T_{LSD}$, a change rate $T_{LSD\_slp}$ of the differential limit torque $T_{LSD}$ to cancel the limitation of differential rotation, using the following formula:

$$t=\{T_{LSD\_strt}-(T_{LSD\_end}+T_{diff}(n)/2)\}/T_{LSD\_slp}.$$

In the above formula, the differential limit torque $T_{LSD}$ and the change rate $T_{LSD\_slp}$ are constants determined based on an experimental result or the like.

Thereafter, the differential torque $T_w$ in the first routine is calculated at step S106. As described, steps S104 to S106 are executed after the determination of the cancellation of the limitation of differential rotation is made at step S103. At step S106, therefore, an initial value of the differential torque $T_w(n)$ is calculated using the following formula:

$$T_w(n)=F_{cal}(T_{LSD\_end}+T_{diff}(n)/2)-K_s \cdot t$$

where "$F_{cal}(T_{LSD\_end}+T_{diff}(n)/2)$" is a function to calculate the differential torque $T_w$ to the differential motors 10 and 17, and "$K_s$" is an amount to change the differential torque gradually determined based on an experimental result or the like.

Figure 15:
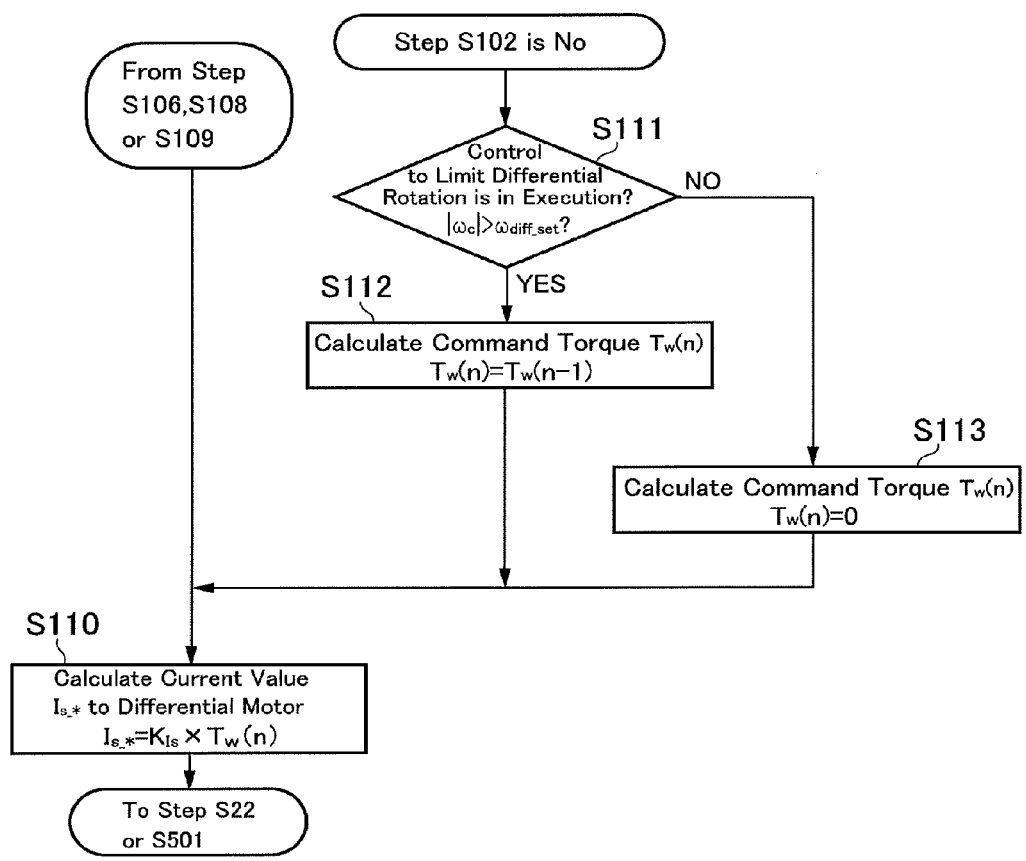
FIG. 15 is a flowchart showing steps S110 to S103 of the subroutine for calculating the current value $I_{s\_*}$ to the differential motor executed at steps S21, S25 and S26 in the routine shown in FIG. 8.

After thus calculating the initial value of the differential torque $T_w(n)$ at step S106, the routine progresses to step S110 in the routine shown in FIG. 15 to calculate the current value $I_{s\_*}$ supplied to each of the differential motors 10 and 17 using the following formula:

$$I_{s\_*}=K_{Is} \cdot T_w(n)$$

where "$K_{Is}$" is a coefficient used to convert the differential torque $T_w(n)$ into the current value $I_{s\_*}$ determined based on the specifications of the differential motors 10 and 17.

By contrast, if the current routine is not the first routine to cancel the limitation of differential rotation in the torque vectoring devices 5 and 6 so that the answer of step S103 is NO, the routine progresses to step S107 to determine whether or not the limitation of differential rotation in the torque vectoring devices 5 and 6 has already been cancelled. At step S107, specifically, it is determined whether or not the difference $T_{diff}(n)$ between the command torques to the right wheel and the left wheel is not 0 but an absolute value $\omega_c$ of an angular velocity of each of the differential motors 10 and 17 is greater than a threshold value $\omega_{diff\_res}$ for determining actuation of the differential motors 10 and 17. To this end, the threshold value $\omega_{diff\_res}$ is set based on an experimental result. That is, if the absolute value $\omega_c$ of an angular velocity of each of the differential motors 10 and 17 is greater than a threshold value $\omega_{diff\_res}$, the first controller 51 determines that the cancellation of the limitation of differential rotation in the torque vectoring devices 5 and 6 is in process.

If the control for cancelling the limitation of differential rotation in the torque vectoring devices 5 and 6 is in process and the absolute value $\omega_c$ of an angular velocity of each of the differential motors 10 and 17 is greater than a threshold value $\omega_{\mathit{diff\_res}}$ so that the answer of step S107 is YES, the routine progresses to step S108 to calculate the differential torque $T_w(n)$ in the current routine. At step S108, specifically, the differential torque $T_w(n)$ in the second or subsequent routine is calculated using the following formula:

$$T_w(n) = F_{cal}(T_{LSD\_end} + T_{diff}(n)/2)$$

More specifically, as indicated in FIG. 16, the differential torque $T_w(n)$ is calculated in such a manner as to increase the differential torque $T_w$ from point t1 to point t2.

After thus calculating the differential torque $T_w(n)$ at step S108, as the case of calculating the differential torque $T_w(n)$ in the first routine, the routine also progresses to step S110 in the routine shown in FIG. 15 to calculate the current value $I_{s\_*}$ supplied to each of the differential motors 10 and 17.

By contrast, if the control for cancelling the limitation of differential rotation in the torque vectoring devices 5 and 6 is in process but the absolute value $\omega_c$ of an angular velocity of each of the differential motors 10 and 17 is smaller than the threshold value $\omega_{\mathit{diff\_res}}$ so that the answer of step S107 is NO, the routine progresses to step S109 to calculate the differential torque $T_w(n)$ in such a manner as to increase the differential torque $T_w$ mildly from point t2 to point t3 in FIG. 16. In this case, specifically, the differential torque $T_w(n)$ is calculated using the following formula:

$$T_w(n) = T_w(n-1) + K_s.$$

After thus calculating the differential torque $T_w(n)$ at step S109, as the case of calculating the differential torque $T_w(n)$ in the first routine, the routine also progresses to step S110 in the routine shown in FIG. 15 to calculate the current value $I_{s\_*}$ supplied to each of the differential motors 10 and 17.

By thus controlling the limited slip differentials 11 and 18 and the differential motors 10 and 17 based on the target torque $T_{LSD\_end}$, the required time t and the differential torque $T_w(n)$, an operating mode of each the torque vectoring devices 5 and 6 can be shifted from the differential limit mode to the differential mode smoothly without causing shocks. Changes in the differential limit torque $T_{LSD}$ and the differential torque $T_w$ during cancelling the limitation of differential rotation in each of the torque vectoring devices 5 and 6 are indicated in FIG. 16 in detail. When the cancellation of the limitation of differential rotation in each of the torque vectoring devices 5 and 6 is started at point t1, the differential limit torque $T_{LSD}$ is reduced to the starting torque $T_{LSD\_strt}$. Then, the differential limit torque $T_{LSD}$ is further reduced gradually at the change rate $T_{LSD\_slp}$ to the target torque $T_{LSD\_end}$ during the required time t from point t2 to point t3 as the end point of the required time t. Meanwhile, the differential torque $T_w$ is increased gradually toward the target torque $T_{LSD\_end}$ from point t2 to point t3. Consequently, at point t3 as the end point of the required time t, the differential torque $T_w$ is equalized to the differential limit torque $T_{LSD}$ so that each of the torque vectoring devices 5 and 6 is brought into a preparatory state to switch the operating mode from the differential limit mode to the differential mode, and hence each of the torque vectoring devices 5 and 6 is allowed to start differential rotation smoothly from point t3. Thus, in order to allow the torque vectoring devices 5 and 6 to perform differential rotation, a difference between the differential torque $T_w$ and the differential limit torque $T_{LSD}$ is reduced gradually based on the change rate $T_{LSD\_slp}$ (i.e., a first changing coefficient) within the required time t (i.e., a first changing function).

After allowing each of the torque vectoring devices 5 and 6 to perform differential rotation, the differential limit torque $T_{LSD}$ is further reduced until point t4 to a preload torque $T_{LSD\_pre}$ as a brake torque established by each of the limited slip differentials 11 and 18 and maintained to the preload torque $T_{LSD\_pre}$ until point t5. That is, the torque vectoring devices 5 and 6 perform differential rotation while maintaining the preload torque $T_{LSD\_pre}$ to reduce backlash between gears in the differential mechanisms 7 and 14 and the torque reversing mechanism 25. For this reason, the operating mode of each of the torque vectoring device 5 and 6 can be shifted from the differential mode to the differential limit mode promptly when required.

Thus, in the case that the cancellation of the limitation of differential rotation in each of the torque vectoring devices 5 and 6 is determined at step S102, the foregoing steps S103 to S109 are executed to cancel the limitation of differential rotation in each of the torque vectoring devices 5 and 6. In order to shift the operating mode of each of the torque vectoring devices 5 and 6 promptly from the differential mode to the differential limit mode, the differential motors 10 and 17 and the limited slip differentials 11 and 18 may also be controlled based on the target torque $T_{LSD\_end}'$, the required time t', the starting torque $T_{LSD\_strt}'$ and the change rate $T_{LSD\_slp}'$. Changes in the differential limit torque $T_{LSD}$ and the differential torque $T_w$ of this case are indicated from point t5 to t8 in FIG. 16.

In this case, when the limitation of differential rotation in each of the torque vectoring devices 5 and 6 is started at point t5, the differential limit torque $T_{LSD}$ is increased from the starting torque $T_{LSD\_strt}$ to the target torque $T_{LSD\_end}'$ at the change rate $T_{LSD\_slp}'$ during the required time t', that is, until point t6 as an end point of the required time t' at which each of the torque vectoring devices 5 and 6 is brought into the preparatory state. Meanwhile, the differential torque $T_w$ is reduced gradually toward the target torque $T_{LSD\_end}'$ from point t5 to point t6. Consequently, at point t6 as the end point of the required time t', the differential torque $T_w$ is equalized to the differential limit torque $T_{LSD}$ again so that differential rotations in the torque vectoring devices 5 and 6 can be limited promptly. Thus, in order to limit differential rotation in the torque vectoring devices 5 and 6 promptly, a difference between the differential torque $T_w$ and the differential limit torque $T_{LSD}$ is reduced gradually based on the change rate $T_{LSD\_slp}'$ (i.e., a second changing coefficient) within the required time t' (i.e., a second changing function).

The foregoing controls to shift the operating mode of each of the torque vectoring devices 5 and 6 from the differential mode to the differential limit mode may be simplified as the routine shown in FIG. 15. For example, if the difference $T_{diff}(n)$ between the command torques to the right wheel and the left wheel is 0, that is, if a cancellation of the limitation of differential rotation in the torque vectoring devices 5 and 6 has not yet been required so that the answer of step S102 is NO, the routine progresses to step S111 in the routine shown in FIG. 15. At step S111, specifically, it is determined whether or not the control for limiting differential rotation in the torque vectoring devices 5 and 6 is in execution, or whether or not the control for limiting differential rotation in the torque vectoring devices 5 and 6 has been completed. To this end, it is determined whether or not an absolute value $\omega_c$ of angular velocities of the differential motors 10 and 17 is greater than a threshold value $\omega_{\mathit{diff\_set}}$ as expressed by the following inequality:

$$|\omega_c| > \omega_{\mathit{diff\_set}}.$$

where "$\omega_{\mathit{diff\_set}}$" is a threshold to determine cessation of activation of the differential motors 10 and 17. For example, the absolute value $|\omega_c|$ may be an average value of angular velocities of the differential motors 10 and 17. Alternatively, the absolute value $|\omega_c|$ may be an actual angular velocity of any one of the differential motors 10 and 17. Specifically, if the absolute value $|\omega_c|$ is greater than the threshold $\omega_{diff\_set}$, the first controller 51 determines a fact that the differential motors 10 and 17 are activated, that is, the control for limiting differential rotation in the torque vectoring devices 5 and 6 is in execution.

Here, in order to prevent a control hunting, a hysteresis is set between the threshold $\omega_{diff\_set}$ and the aforementioned threshold value $\omega_{diff\_res}$. Specifically, the threshold value $\omega_{diff\_res}$ is greater than the threshold $\omega_{diff\_set}$ in the amount of hysteresis.

If the controls for limiting differential rotation in the torque vectoring devices 5 and 6 is in execution so that the answer of step S111 is YES, the routine progresses to step S112 to calculate the differential torque $T_w(n)$ using the following formula:

$$T_w(n)=T_w(n-1).$$

In this case, the control for limiting differential rotation in the torque vectoring devices 5 and 6 has been started, but such controls has not yet been completed. In this situation, therefore, the differential motors 10 and 17 are controlled based on the differential torque $T_w$ in the manner indicated between point t5 and point t7 in FIG. 16. At the same time, the differential limit torque $T_{LSD}$ is increased gradually. Consequently, brake torques of the limited slip differentials 11 and 18 applied to the differential motors 10 and 17 are increased so that the differential torque $T_w$ is reduced gradually from $T_w(n-1)$ to $T_w(n)$. As a result, the difference between the differential limit torque $T_{LSD}$ and the differential torque $T_w$ is reduced gradually to control the limited slip differentials 11 and 18 and the differential motors 10 and 17 cooperatively.

By contrast, if the controls for limiting differential rotation in the torque vectoring devices 5 and 6 is not in execution so that the answer of step S111 is NO, the routine progresses to step S113 to calculate the differential torque $T_w(n)$ using the following formula:

$$T_w(n)=0.$$

In this case, the control for limiting differential rotation in the torque vectoring devices 5 and 6 has been completed. Therefore, the differential torque $T_w(n)$ is set to 0 to reduce the actual torques of the differential motors 10 and 17 to 0.

At steps S112 and S113, the differential torque $T_w$ and the differential limit torque $T_{LSD}$ may also be calculated based on the target torque $T_{LSD\_end}$ obtained at step S104 and the required time t obtained at step S105. For this reason, the operating mode of each of the torque vectoring devices 5 and 6 can be shifted promptly from the differential mode to the differential limit mode when required. In addition, since the differential torque $T_w$ and the differential limit torque $T_{LSD}$ are calculated using the parameters calculated at previous steps, calculation to be carried out by the first controller 51 can be simplified to lighten a load on the first controller 51.

Figure 18:
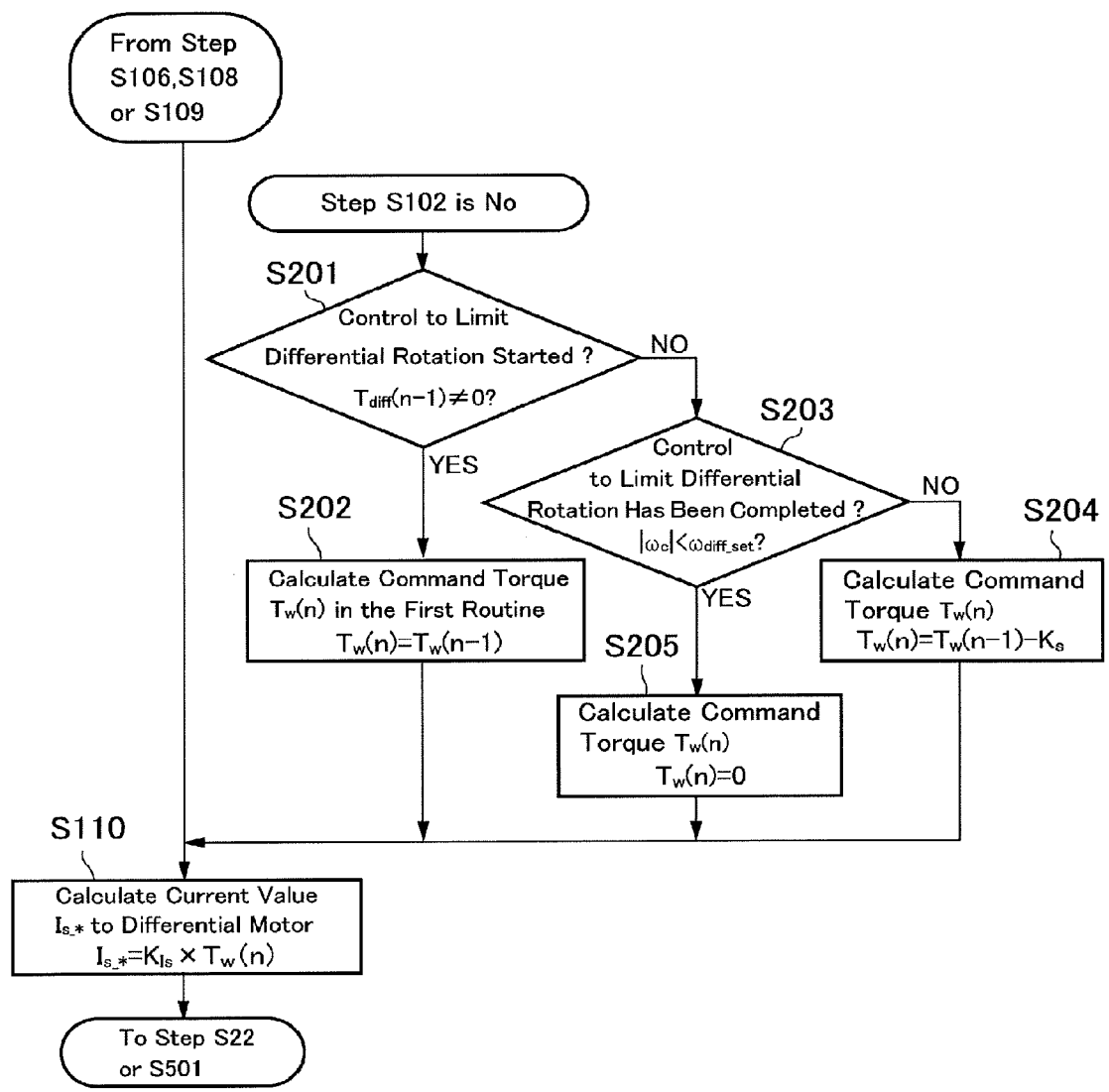
FIG. 18 is a flowchart showing another example of steps S111 to S113 in the routine shown in FIG. 15.

The operating mode of each of the torque vectoring devices 5 and 6 may also be shifted from the differential mode to the differential limit mode by the routine shown in FIG. 18. For example, if the difference $T_{diff}(n)$ between the command torques to the right wheel and the left wheel is 0, that is, if a cancellation of the limitation of differential rotation in the torque vectoring devices 5 and 6 has not yet been required so that the answer of step S102 is NO, the routine may also progress to step S201 in the routine shown in FIG. 18. At step S201, specifically, it is determined whether or not the control for limiting differential rotation in the torque vectoring devices 5 and 6 has been started. In other words, it is determined whether or not the current routine is the first routine to limit differential rotation in the torque vectoring devices 5 and 6. To this end, it is determined whether or not the difference $T_{diff}(n-1)$ between the command torques to the right wheel and the left wheel is 0. If the difference $T_{diff}(n-1)$ as a previous value of the difference between the differential torques $T_{wl}$ to the right wheel and the left wheel is not 0, the first controller 51 determines that the first routine to limit differential rotation in the torque vectoring devices 5 and 6 has been started.

If the current routine is the first routine to limit differential rotation in the torque vectoring devices 5 and 6, that is, if the control for limiting differential rotation in the torque vectoring devices 5 and 6 has been started so that the answer of step S201 is YES, the routine advances to step S202 to calculate an initial value of the differential torque $T_w(n)$ in the first routine to start limiting differential rotation in the torque vectoring devices 5 and 6, using the following formula:

$$T_w(n)=T_w(n-1).$$

Consequently, the differential torque $T_w$ is changed from the previous value $T_w(n-1)$ to $T_w(n)$ to be used in the first routine to start limiting differential rotation in the torque vectoring devices 5 and 6.

By contrast, If the current routine is not the first routine to limit differential rotation in the torque vectoring devices 5 and 6 so that the answer of step S201 is NO, the routine advances to step S203 to determine whether or not the control for limiting differential rotation in the torque vectoring devices 5 and 6 has been completed. To this end, it is determined whether or not an absolute value $\omega_c$ of angular velocities of the differential motors 10 and 17 is greater than a threshold value $\omega_{diff\_set}$ as expressed by the following inequality:

$$|\omega_c|>\omega_{diff\_set}.$$

As described, "$\omega_{diff\_set}$" is a threshold to determine cessation of activation of the differential motors 10 and 17. Specifically, if the absolute value $|\omega_c|$ is smaller than the threshold $\omega_{diff\_set}$, the first controller 51 determines a fact that the differential motors 10 and 17 are stopped, that is, the control for limiting differential rotation in the torque vectoring devices 5 and 6 has been completed.

If the control for limiting differential rotation in the torque vectoring devices 5 and 6 has not yet been completed so that the answer of step S203 is NO, the routine progresses to step S204 to calculate the differential torque $T_w(n)$ using the following formula:

$$T_w(n)=T_w(n-1)+K_s.$$

In this situation, the differential torque $T_w(n)$ is reduced gradually in the amount of $K_s$ during execution of the control for limiting differential rotation in the torque vectoring devices 5 and 6. At the same time, the differential limit torque $T_{LSD}$ is increased gradually.

By contrast, if the control for limiting differential rotation in the torque vectoring devices 5 and 6 has already been completed so that the answer of step S203 is YES, the routine progresses to step S205 to calculate the differential torque $T_w(n)$ using the following formula:

$$T_w(n)=0.$$

Consequently, the differential torque $T_w(n)$ is set to 0 to reduce the actual torques of the differential motors 10 and 17 to 0.

After thus calculating the differential torque $T_w(n)$ at steps S202, S204 and S205, the routine also progresses to step S110 in the routine shown in FIG. 15 to calculate the current values $I_{s\_*}$ supplied to each of the differential motors 10 and 17.

Figure 8:
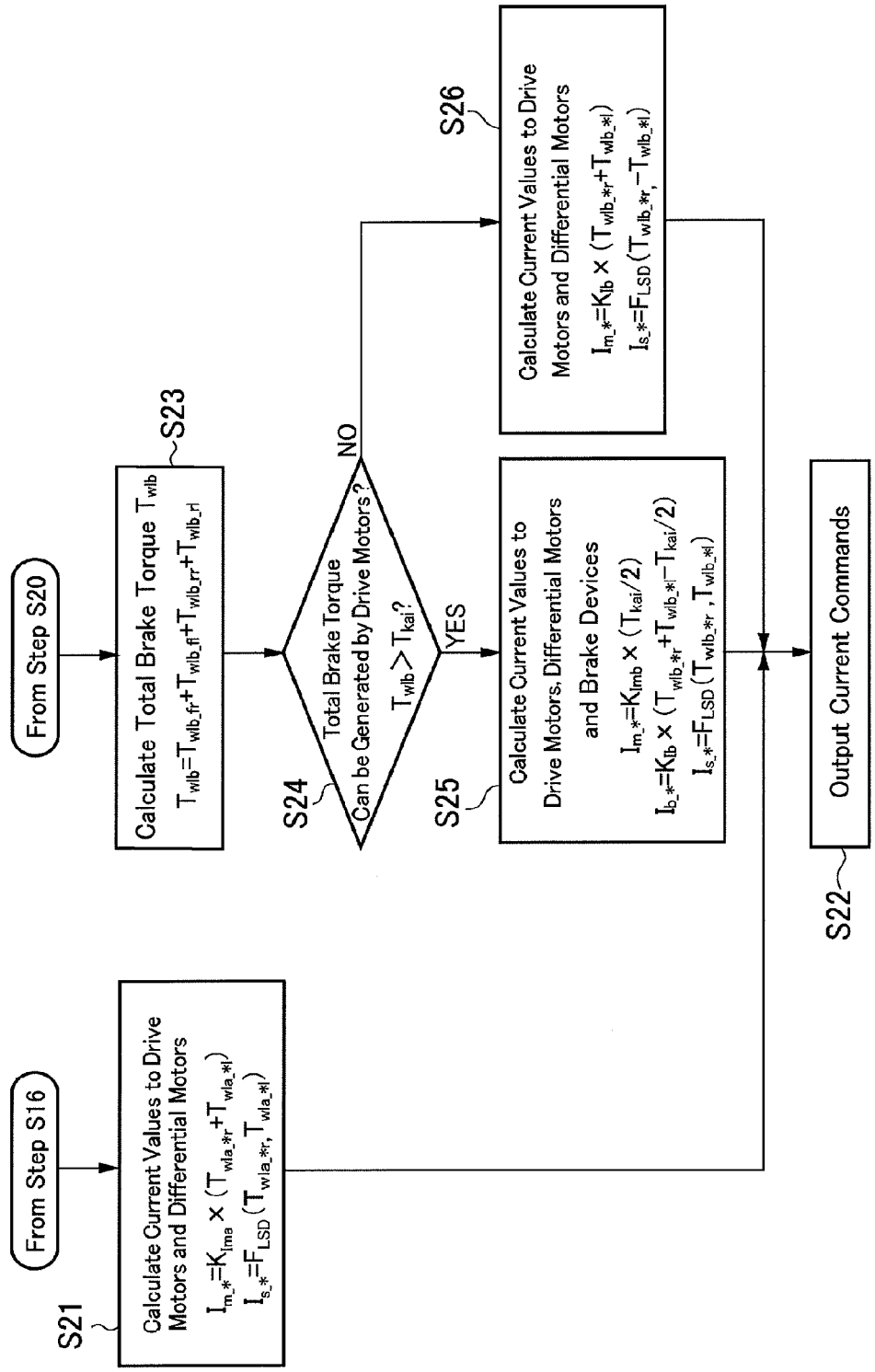
FIG. 8 is a flowchart showing steps S21 to S26 is executed in the driving force control system of the vehicle.
Figure 21:
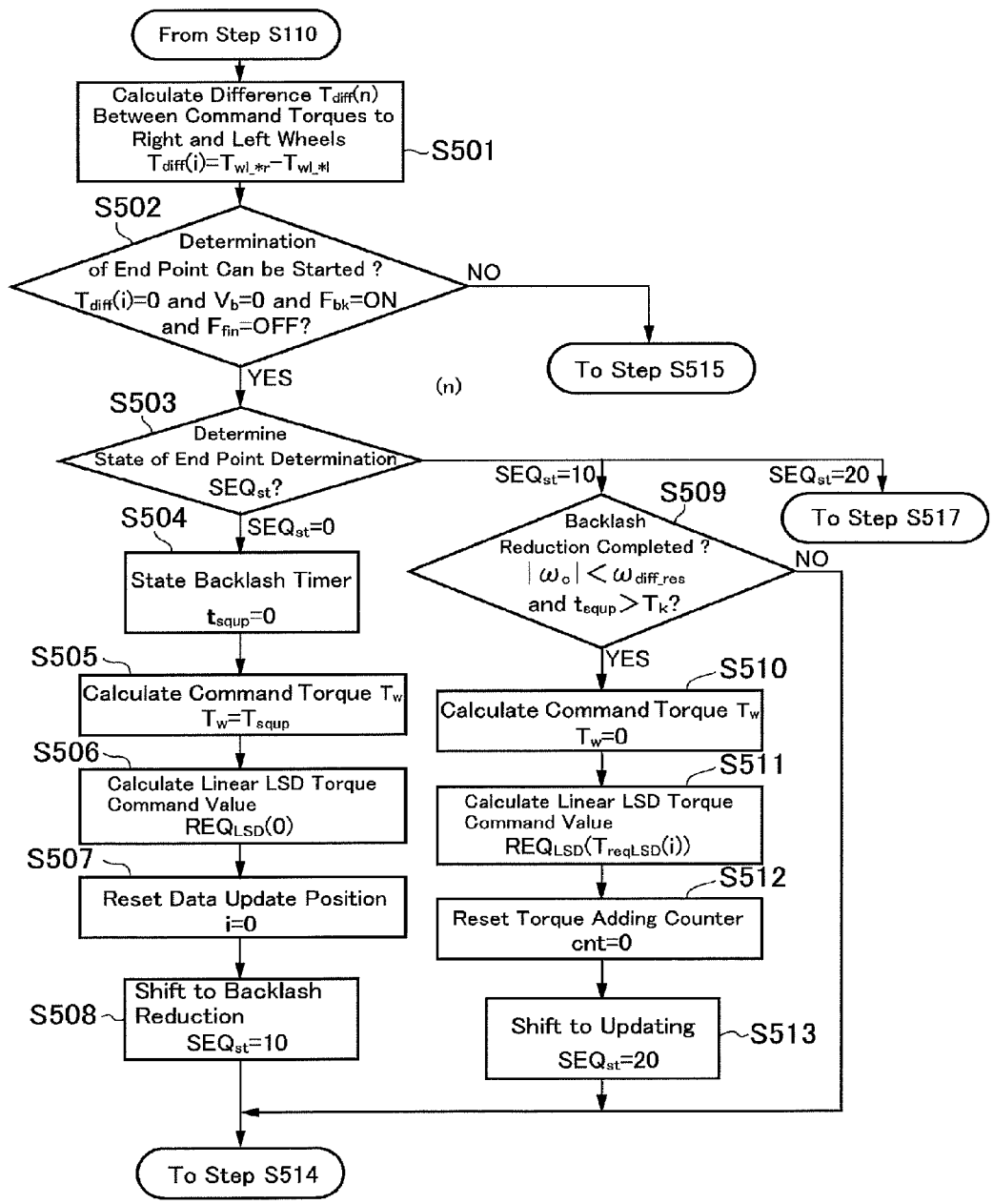
FIG. 21 is a flowchart showing an example of a part of a routine for correcting the target torque $T_{LSD\_end}$ when the vehicle is stopped.

After calculating the current values $I_{s\_*}$, the routine progresses to step S22 in FIG. 8, or after-mentioned step S501 in FIG. 21. As described, at step S22, the current values $I_{s\_*}$ thus calculated at foregoing steps based on the differential torque $T_w(n)$ are supplied to the differential motors 10 and 17.

In the case of using the routine shown in FIG. 18 to calculate the differential torque $T_w$, the differential motors 10 and 17 is also controlled based on the current values $I_{s\_*}$ cooperatively with the limited slip differentials 11 and 18. Specifically, the differential limit torque $T_{LSD}$ is increased gradually while reducing the differential torque $T_w$ gradually. For this reason, the operating mode of each of the torque vectoring devices 5 and 6 can be shifted promptly from the differential mode to the differential limit mode without causing shocks.

Figure 19:
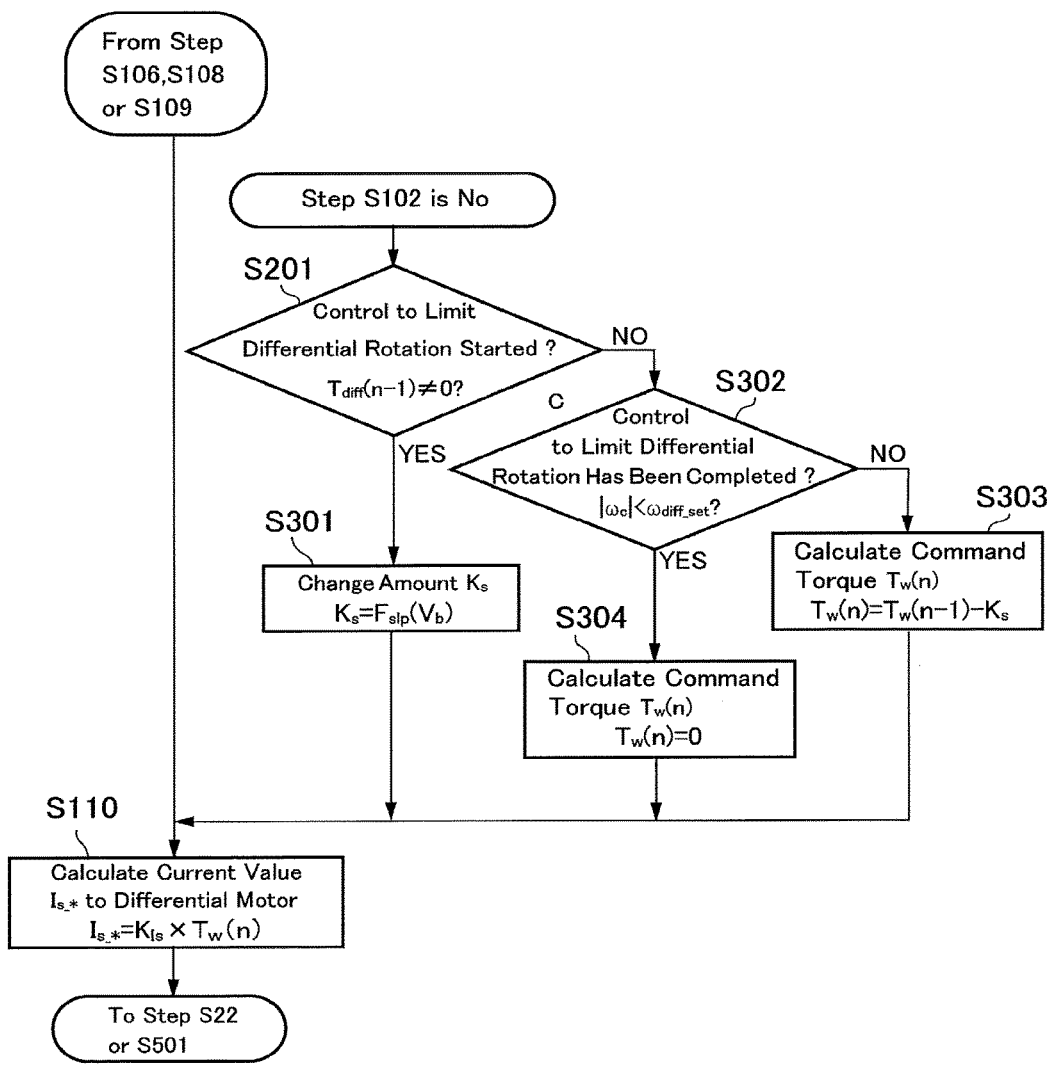
FIG. 19 is a flowchart showing another example of steps S202 to S205 in the routine shown in FIG. 18.

In the routine shown in FIG. 18, steps S301 to S304 shown in FIG. 19 may also be carried out to calculate the differential torque $T_w$ to the instead of steps S 202 to S205. For example, if the current routine is the first routine to limit differential rotation in the torque vectoring devices 5 and 6, that is, if the control for limiting differential rotation in the torque vectoring devices 5 and 6 has been started so that the answer of step S201 is YES, the routine may also advance to step S301 shown in FIG. 19 to calculate a change amount $K_s$ of the differential torque $T_w$ using the following formula:

$$K_s = F_{slp}(V_b)$$

where "$F_{slp}(V_b)$" is a function to calculate the differential torque $T_w$ using a vehicle speed $V_b$ as a parameter. Specifically, the $F_{slp}(V_b)$ is set in such a manner that the change amount $K_s$ is increased with an increase in the vehicle speed $V_b$.

By contrast, if the current routine is not the first routine to limit differential rotation in the torque vectoring devices 5 and 6 so that the answer of step S201 is NO, the routine advances to step S302 to determine whether or not the control for limiting differential rotation in the torque vectoring devices 5 and 6 has been completed. To this end, it is determined whether or not an absolute value $|\omega_c|$ of angular velocities of the differential motors 10 and 17 is greater than a threshold value $\omega_{diff\_set}$ as expressed by the following inequality:

$$|\omega_c| > \omega_{diff\_set}.$$

As described, "$\omega_{diff\_set}$" is a threshold to determine cessation of activation of the differential motors 10 and 17. Specifically, if the absolute value $|\omega_c|$ is smaller than the threshold $\omega_{diff\_set}$, the first controller 51 determines a fact that the differential motors 10 and 17 are stopped, that is, the control for limiting differential rotation in the torque vectoring devices 5 and 6 has been completed.

If the control for limiting differential rotation in the torque vectoring devices 5 and 6 has not yet been completed so that the answer of step S302 is NO, the routine progresses to step S303 to calculate the differential torque $T_w(n)$ using the following formula:

$$T_w(n) = T_w(n-1) + K_s.$$

In this situation, the differential torque $T_w(n)$ is reduced gradually in the amount of $K_s$ during execution of the control for limiting differential rotation in the torque vectoring devices 5 and 6. At the same time, the differential limit torque $T_{LSD}$ is increased gradually.

By contrast, if the control for limiting differential rotation in the torque vectoring devices 5 and 6 has already been completed so that the answer of step S302 is YES, the routine progresses to step S304 to calculate the differential torque $T_w(n)$ using the following formula:

$$T_w(n) = 0.$$

Consequently, the differential torque $T_w(n)$ is set to 0 to reduce the actual torques of the differential motors 10 and 17 to 0.

After thus calculating the differential torque $T_w(n)$ at steps S301, S303 and S304, the routine also progresses to step S110 in the routine shown in FIG. 15 to calculate the current values $I_{s\_*}$ supplied to the differential motors 10 and 17.

After calculating the current value $I_{s\_*}$, the routine progresses to step S22 in FIG. 8, or after-mentioned step S501 in FIG. 21. As described, at step S22, the current values $I_{s\_*}$ thus calculated at foregoing steps based on the differential torque $T_w(n)$ are supplied to the differential motors 10 and 17.

Thus, in the routine shown in FIG. 19, the change amount $K_s$ is increased with an increase in the vehicle speed $V_b$ when starting the control for limiting differential rotation in the torque vectoring devices 5 and 6. Therefore, differential rotation in the torque vectoring devices 5 and 6 can be limited promptly when traveling in a straight line at high speed in comparison with a case of travelling in a straight line at a medium speed or low speed. For this reason, straight running property of the vehicle Ve can be improved during propulsion at a high speed.

Figure 20:
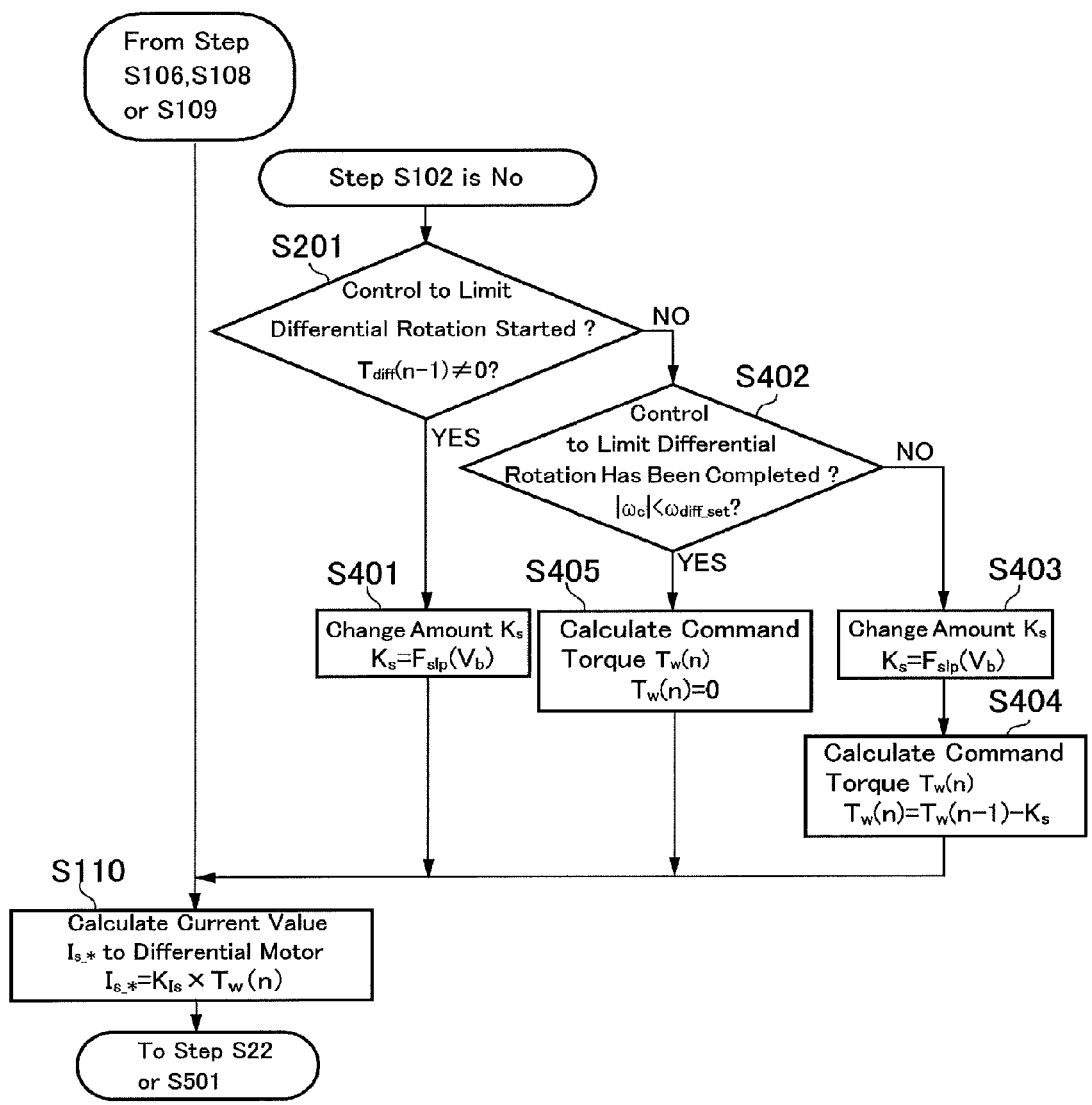
FIG. 20 is a flowchart showing still another example of steps S202 to S205 in the routine shown in FIG. 18.

In the routine shown in FIG. 18, steps S401 to S305 shown in FIG. 20 may also be carried out to calculate the differential torque $T_w$ to the differential motors 10 and 17 instead of steps S 202 to S205. For example, if the current routine is the first routine to limit differential rotation in the torque vectoring devices 5 and 6, that is, if the control for limiting differential rotation in the torque vectoring devices 5 and 6 has been started so that the answer of step S201 is YES, the routine may also advance to step S401 shown in FIG. 20 to calculate a change amount $K_s$ of the command torque $T_w$ using the following formula:

$$K_s = F_{slp}(V_b).$$

As described, the $F_{slp}(V_b)$ is set in such a manner that the change amount $K_s$ is increased with an increase in the vehicle speed $V_b$.

By contrast, if the current routine is not the first routine to limit differential rotation in the torque vectoring devices 5 and 6 so that the answer of step S201 is NO, the routine advances to step S402 to determine whether or not the control for limiting differential rotation in the torque vectoring devices 5 and 6 has been completed. To this end, it is determined whether or not an absolute value $\omega_c$ of angular velocities of the differential motors 10 and 17 is greater than a threshold value $\omega_{diff\_set}$ as expressed by the following inequality:

$$|\omega_c| > \omega_{diff\_set}.$$

If the control for limiting differential rotation in the torque vectoring devices 5 and 6 has not yet been completed so that the answer of step S402 is NO, the routine progresses to step S403 to calculate the change amount $K_s$ of the differential torque $T_w$ again using the following formula:

$$K_s = F_{slp}(V_b).$$

In this case, the $F_{sp}(V_b)$ is also set in such a manner that the change amount $K_s$ is increased with an increase in the vehicle speed $V_b$. Thus, in the routine shown in FIG. 20, the change amount $K_s$ of the command torque $T_w$ is calculated based on the vehicle speed $V_b$ when starting the control for limiting differential rotation in the torque vectoring devices 5 and 6, and in every routine during execution of the control for limiting differential rotation in the torque vectoring devices 5 and 6.

Then, the differential torque $T_w(n)$ is calculated at step S404 using the following formula:

$$T_w(n)=T_w(n-1)+K_s.$$

In this situation, the command torque $T_w(n)$ is reduced gradually in the amount of $K_s$ calculated at steps S401 and S403 during execution of the control for limiting differential rotation in the torque vectoring devices 5 and 6. At the same time, the differential limit torque $T_{LSD}$ is increased gradually.

By contrast, if the control for limiting differential rotation in the torque vectoring devices 5 and 6 has already been completed so that the answer of step S402 is YES, the routine progresses to step S405 to calculate the differential torque $T_w(n)$ using the following formula:

$$T_w(n)=0.$$

Consequently, the differential torque $T_w(n)$ is set to 0 to reduce the actual torques of the differential motors 10 and 17 to 0.

After thus calculating the differential torque $T_w(n)$ at steps S401, S404 and S405, the routine also progresses to step S110 in the routine shown in FIG. 15 to calculate the current values $I_{s\_*}$ supplied to the differential motors 10 and 17.

After calculating the current value $I_{s\_*}$, the routine progresses to step S22 in FIG. 8, or after-mentioned step S501 in FIG. 21. As described, at step S22, the current values $I_{s\_*}$ thus calculated at foregoing steps based on the differential torque $T_w(n)$ are supplied to the differential motors 10 and 17.

Thus, in the routine shown in FIG. 20, the change amount $K_s$ is increased with an increase in the vehicle speed $V_b$ when starting the control for limiting differential rotation in the torque vectoring devices 5 and 6, and in every routine during execution of the control for limiting differential rotation in the torque vectoring devices 5 and 6. Therefore, differential rotation in the torque vectoring devices 5 and 6 can be limited promptly when traveling in a straight line at high speed in comparison with a case of travelling in a straight line at a medium speed or low speed. In addition, since the change amount $K_s$ is obtained in every routine based on the vehicle speed $V_b$, the differential rotation in the torque vectoring devices 5 and 6 can be limited properly depending on a running condition of the vehicle Ve.

Figure 22:
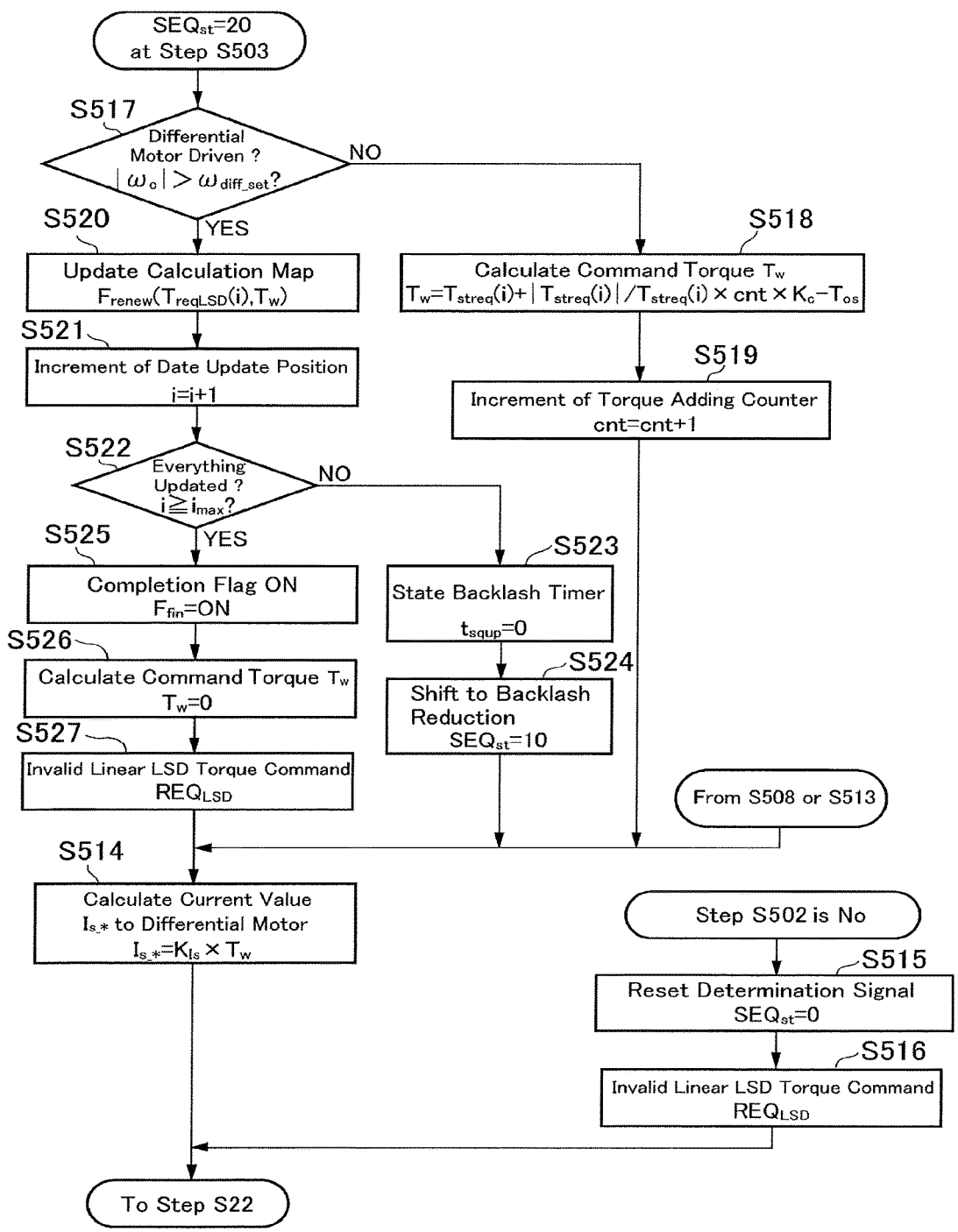
FIG. 22 is a flowchart showing an example of another part of the routine for correcting the target torque $T_{LSD\_end}$ when the vehicle is stopped.

In order to improve accuracy to calculate the current value $I_{s\_*}$ supplied to each of the differential motors 10 and 17, the first controller 51 is further configured to update the target torque $T_{LSD\_end}$ to determine the end point of the required time t. Details of such control are shown in FIGS. 21 and 22. Specifically, the routine shown in FIG. 21 is started when stopping the vehicle Ve after calculating the current value $I_{s\_*}$ at step S110. For example, the routine shown in FIG. 21 may be executed every time the vehicle Ve is stopped, or at a predetermined frequency. In addition, the routine shown in FIG. 21 may also be executed in a factory before shipment. Although the routine shown in FIG. 21 is continued from step S110 for the sake of illustration and explanation, the routine shown in FIG. 21 may also be executed prior to or independently from the calculation of the current value to the differential motors.

As described, the routine shown in FIG. 21 is executed to find a latest the target torque $T_{LSD\_end}$ to update the end point of the required time t when the vehicle Ve is stopped or before shipment from the factory. In the routine shown in FIG. 21, first of all, a difference $T_{diff}(i)$ between the command torques to the right front wheel 3R and the left front wheel 3L, and a difference $T_{diff}(i)$ between the command torques to the right rear wheel 4R and the left rear wheel 4L are individually calculated the following formula:

$$T_{diff}(i)=T_{wl\_*r}-T_{wl\_*l}$$

where "$T_{diff}(i)$" is an updated current value of the difference $T_{diff}$. That is, the updated difference $T_{diff}(i)$ calculated in a previous routine is expressed as "$T_{diff}(i-1)$". As described, "*" represents both of the front wheel and the rear wheel.

Then, at step S502, it is determined whether or not a determination of the end point of the required time t in the stopping vehicle Ve can be started. At step S502, specifically, it is determined whether or not all of the flowing conditions are satisfied:

$$T_{diff}(i)=0, V_b=0, F_{bk}=0, \text{ and } F_{fin}=\text{OFF}.$$

In the above-listed conditions, "$F_{bk}$" is a flag to determine an actuation of the brake device 8 that is turned on when a brake pedal is depressed, and "$F_n$" is a flag to determine a completion of the determination of the end point that is turned on when the determination of the end point is completed. Specifically, the flag "$F_{fin}$" is turned on when both of the below-mentioned backlash reduction and updating of the end point are completed.

If all of the above-listed conditions are satisfied so that the answer of step S502 is YES, the routine progresses to step S503 to determine a state of the determination of the end point based on a determination signal $SEQ_{st}$. Specifically, the determination signal $SEQ_{st}$ is set to "0" when the determination of the end point is not in execution, to "10" when executing the below-mentioned backlash reduction, and to "20" when the below-mentioned updating of the end point. Accordingly, in the beginning of the routine shown in FIG. 21 (or in the first routine), the determination signal $SEQ_{st}$ is set to "0" as an initial value.

If the determination signal $SEQ_{st}$ is set to "0", the routine progresses to step S504 to start the backlash reduction to reduce backlash between gears in the differential mechanisms 7 and 14 and the torque reversing mechanism 25.

At step S504, specifically, a backlash timer is started. More specifically, the backlash timer $t_{squp}$ is reset to 0 to start measuring elapsed time from the commencement of the backlash reduction.

At step S505, the differential torque $T_w$ is calculated using the following formula:

$$T_w=T_{squp}.$$

Consequently, the differential torque $T_w$ is set to "$T_{squp}$" as an initial command value of the differential torque $T_w$ to reduce backlash that is determined based on an experimental result.

At step S506, a linear LSD torque command value is demanded, that is, the differential limit torque $T_{LSD}$ is transmitted to the limited slip differentials 11 and 18. Specifically, a return value of a function $REQ_{LSD}(0)$ for demanding the differential limit torque in which a parameter is 0 is transmitted as the differential limit torque $T_{LSD}$ required to each of the limited slip differentials 11 and 18.

At step S507, a data update position i is reset to zero. Specifically, the data update position i is a point to measure the target torque $T_{LSD\_end}$. To this end, the data update position i is set in advance in such a manner as to execute the measurement of the target torque $T_{LSD\_end}$ at a predetermined timing and frequency.

At step S508, the determination signal $SEQ_{st}$ is set to 10 to execute the backlash reduction.

An order to execute the foregoing steps S504 to S508 may be altered according to need. Instead, the foregoing steps S504 to S508 may also be executed concurrently.

Then, the routine progresses to step S514 in the routine shown in FIG. 22 to calculate the current values $I_{s\_*}$ supplied to the differential motors 10 and 17 based on the differential torque $T_w$ calculated at step S505. Thereafter, the routine progresses to step S22 in FIG. 8, that is, the control exits from the routine to determine the end point of the required time t.

In a case that the determination signal $SEQ_{st}$ is set to 10 at step S503, the routine progresses to step S509 to determine whether or not the backlash reduction has been completed. Specifically, it is determined whether or not all of the following inequalities are satisfied:

$$|\omega_c|<\omega_{diff\_res}, \text{ and } t_{squp}>T_k$$

In the above inequality, "$T_k$" is a threshold value for determining a completion of the backlash reduction that is determined based on an experimental result.

If the backlash reduction has been completed, that is all of the above-listed inequalities are satisfied so that the answer of step S509 is YES, the routine progresses to step S510.

At step S510, the differential torque $T_w$ is calculated using the following formula:

$$T_w=0.$$

That is, the differential torque $T_w$ is temporarily set to 0.

At step S511, a linear LSD torque command value is demanded, in other words, the differential limit torque $T_{LSD}$ is transmitted to the limited slip differentials 11 and 18. Specifically, a return value of a function $REQ_{LSD}(T_{reqLSD}(i))$ for demanding the differential limit torque in which a parameter is $T_{reqLSD}(i)$ is transmitted as the differential limit torque $T_{LSD}$ to each of the limited slip differentials 11 and 18. To this end, "$T_{reqLSD}(i)$" as a function to calculate the target torque $T_{LSD\_end}$ required to each of the limited slip differentials 11 and 18 when measuring the target torque $T_{LSD\_end}$ in the current routine is prepared in advance.

At step S512, a torque adding counter cnt is reset to 0.

At step S513, the determination signal $SEQ_{st}$ is set to 20 to execute the updating of the end point when the vehicle Ve is stopped.

An order to execute the foregoing steps S510 to S513 may be altered according to need. Instead, the foregoing steps S510 to S513 may also be executed concurrently.

Then, the routine progresses to step S514 in the routine shown in FIG. 22 to calculate the current values $I_{s\_*}$ supplied to the differential motors 10 and 17 based on the differential torque $T_w$ calculated at step S510. Thereafter, the routine progresses to step S22 in FIG. 8, that is, the control exits from the routine to determine the end point of the required time t.

If at least one of the conditions to start the determination of the end point of the required time t in the stopping vehicle Ve is not satisfied so that the answer of step S502 is NO, the routine progresses to step S515 in the routine shown in FIG. 22.

At step S515, the determination signal $SEQ_{st}$ is reset to 0, and at step S516, the linear LSD torque command value demanded to each of the limited slip differentials 11 and 18 is invalidated. At step S516, specifically, signals to invalid the controls of the limited slip differentials 11 and 18 are transmitted. An order to execute steps S515 and S516 may be switched according to need. Instead, steps S515 and S516 may also be executed concurrently.

Thereafter, the routine progresses to step S22 in FIG. 8, that is, the control exits from the routine to determine the end point of the required time t.

In a case that the determination signal $SEQ_{st}$ is set to 20 at step S503, the routine progresses to step S517 in the routine shown in FIG. 22 to determine operating conditions of the differential motors 10 and 17. Specifically, it is determined whether or not the following inequality is satisfied:

$$|\omega_c|>\omega_{diff\_set}?$$

If an absolute value $\omega_c$ is greater than the threshold $\omega_{diff\_set}$, the first controller 51 determines a fact that the differential motors 10 and 17 are activated.

If the differential motors 10 and 17 are not driven, that is, if the an absolute value $\omega_c$ is smaller than the threshold $\omega_{diff\_set}$ so that the answer of step S517 is NO, the routine progresses to step S518.

At step S518, the differential torque $T_w$ is calculated using the following formula:

$$T_w=T_{streq}(i)+|T_{streq}(i)|/T_{streq}(i)\cdot cnt\cdot K_c\cdot T_{os}$$

where "$T_{streq}(i)$" is a preset function to calculate the differential torque $T_w$ required to each of the differential motors 10 and 17 when measuring the target torque $T_{LSD\_end}$ in the current routine, "cnt" is the torque adding counter for counting the number of times of calculation of the differential torque $T_w$, "$K_c$" is an amount of increase in the differential torque, and "$T_{os}$" is a torque offset value at the end point of the required time t. The amount of increase K and the torque offset value $T_{os}$ as constants may be determined based on an experimental result.

Then, at step S519, an increment of the torque adding counter cnt is carried out. Specifically, "1" is added to the torque adding counter cnt.

Then, the routine progresses to step S514 in the routine shown in FIG. 22 to calculate the current values $I_{s\_*}$ supplied to the differential motors 10 and 17 based on the differential torque $T_w$ calculated at step S518. Thereafter, the routine progresses to step S22 in FIG. 8, that is, the control exits from the routine to determine the end point of the required time t.

If the differential motors 10 and 17 are driven, that is, if the absolute value $\omega_c$ is greater than the threshold $\omega_{diff\_set}$ so that the answer of step S517 is YES, the routine progresses to step S520.

At step S520, the map for calculating the target torque at the end point of the required time t is updated. Specifically, the function $F_{map}(T_{LSD})$ to calculate the target torque $T_{LSD\_end}$ shown in FIG. 17 used to calculate the current values to the differential motors is updated to $F_{renew}(T_{reqLSD}(i), T_w)$.

Then, at step S521, an increment of the data update position i is carried out. That is, since 1 was added to the torque adding counter cnt counting the number of times of calculation of the differential torque $T_w$ at step S519, 1 is also added to the data update position i.

Then, at step S522, it is determined whether or not all of the planned updating has been completed. As described, the data update position i is updated predetermined number of times to update the calculation map by measuring the target torque $T_{LSD\_end}$. That is, the calculation map for calculating the target torque $T_{LSD\_end}$ is updated "$i_{max}$" times at a maximum. At step S522, therefore, the first controller 51 determines that all of the planned updating has been completed when data update position i reaches $i_{max}$ (that is, i≥$i_{max}$ is satisfied).

If all of the updating has not yet been completed so that the answer of step S522 is NO, the routine progresses to step S523.

At step S523, specifically, the backlash timer is started. More specifically, the backlash timer $t_{squp}$ is reset to 0 to start measuring elapsed time from the commencement of the backlash reduction.

At step S524, the determination signal $SEQ_{st}$ is set to 10 to execute the backlash reduction again. An order to execute steps S523 and S524 may be switched according to need. Instead, steps S523 and S524 may also be executed concurrently.

Then, the routine progresses to step S514 in the routine shown in FIG. 22 to calculate the current values $I_{s\_*}$ supplied to the differential motors 10 and 17 based on the differential torque $T_w$ calculated at step S518. Thereafter, the routine progresses to step S22 in FIG. 8, that is, the control exits from the routine to determine the end point of the required time t.

By contrast, if all of the updating has been completed so that the answer of step S522 is YES, the routine progresses to step S525.

At step S525, since the completion of all of the updating has been made at step S522, a flag $F_{fin}$ representing a completion of the updating of the target torque $T_{LSD\_end}$ is turned on.

At step S526, the differential torque $T_w$ is calculated using the following formula:

$$T_w = 0.$$

That is, the differential torque $T_w$ is set to 0.

At step S527, the linear LSD torque command value demanded to each of the limited slip differentials 11 and 18 is invalidated. Specifically, signals to invalid the controls of the limited slip differentials 11 and 18 are transmitted.

An order to execute the foregoing steps S525 to S527 may be altered according to need. Instead, the foregoing steps S525 to S527 may also be executed concurrently.

After executing steps S525 to S527, the routine progresses to step S514 in the routine shown in FIG. 22 to calculate the current values $I_{s\_*}$ supplied to the differential motors 10 and 17 based on the differential torque $T_w$ calculated at step S526. That is, the current values $I_{s\_*}$ are set to 0.

After executing steps S523 and S524, the routine also progresses to step S514 to calculate the current values $I_{s\_*}$ supplied to the differential motors 10 and 17 based on the differential torque $T_w$ calculated at step S518. Thereafter, the routine progresses to step S22 in FIG. 8, that is, the control exits from the routine to determine the end point of the required time t.

Figure 23:
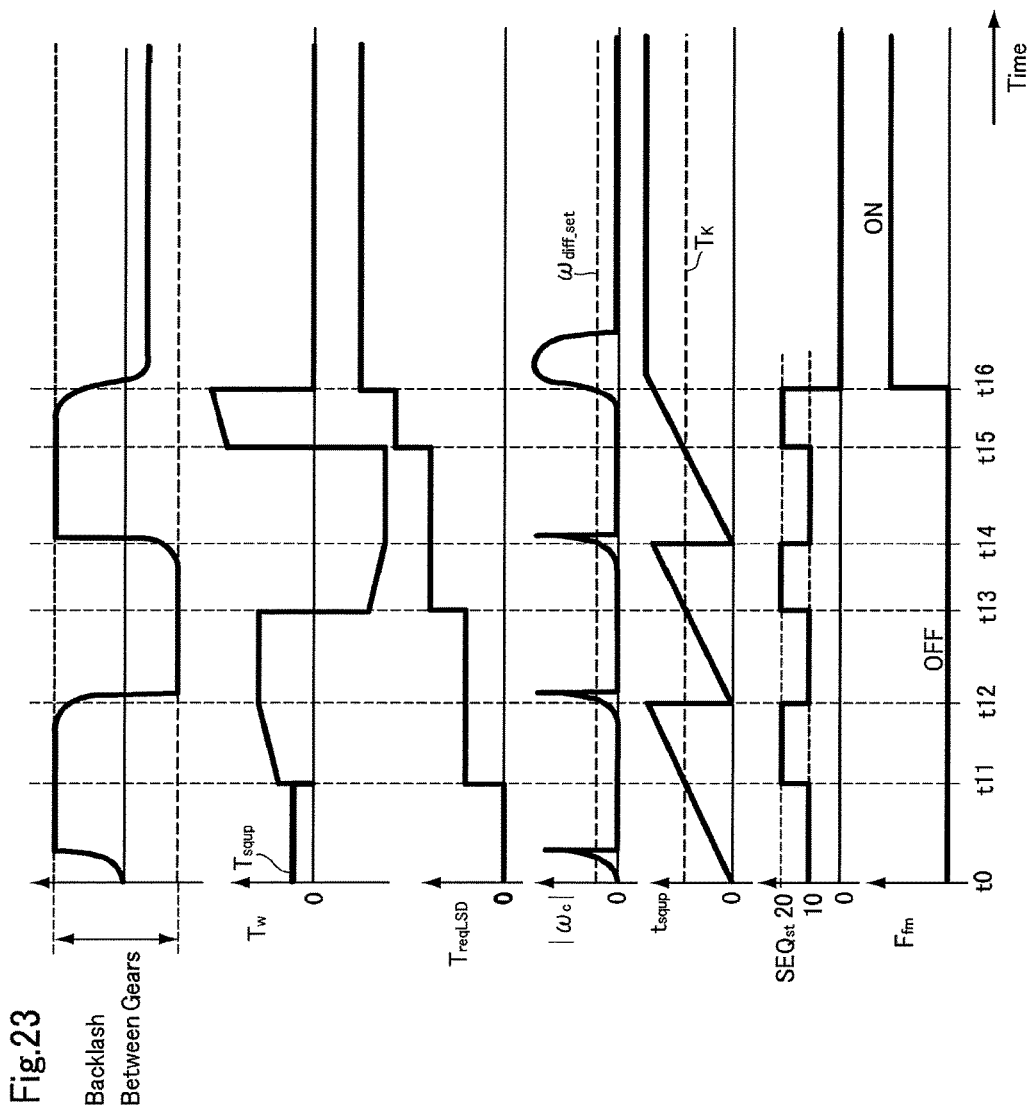
FIG. 23 is a time chart indicating changes in the differential limit torque $T_{LSD}$, the differential torque $T_w$ and an absolute value $\omega_c$ of an angular velocities of differential motors during calculations of the current value $I_{s\_*}$ at steps S21, S25 and S26 in the routine shown in FIG. 8.

FIG. 23 shows changes in the foregoing parameters during execution of the updating of the end point of the required time t. When the updating of the end point of the required time t is started and at point t0, a measurement of the backlash timer $t_{squp}$ is started and the determination signal $SEQ_{st}$ is set to 10. In this situation, the differential torque $T_w$ is set to the initial command value $T_{squp}$, and the differential motors 10 and 17 are activated to carry out backlash reduction. To this end, specifically, the initial command value $T_{squp}$ is set to a small value to merely reduce the backlash between gears without causing a differential rotation between the differential motors 10 and 17. After reducing the backlash, the differential motors 10 and 17 keep generating the initial command value $T_{squp}$ but rotations of differential motors 10 and 17 are stopped. Such backlash reduction is continued until point t11 at which a count value of the backlash timer $t_{squp}$ reaches a completion time $T_k$.

At point t11, the backlash reduction is temporarily terminated to commence the updating of the end point of the required time t. When the updating is started at point t11, the determination signal $SEQ_{st}$ is set to 20, and the differential limit torque $T_{LSD}$ calculated based on the function $REQ_{LSD}$ ($T_{reqLSD}$(i)) at step S511 is transmitted to the limited slip differentials 11 and 18. In this situation, the differential torque $T_w$ is temporarily set to 0, and then gradually increased toward the differential torque $T_w$ calculated at step S518 (expressed as $T_w = T_{streq}(i) + |T_{streq}(i)|/T_{streq}(i) \cdot cnt \cdot K_c - T_{os}$). Consequently, the absolute value $\omega_c$ of an angular velocity of each of the differential motors 10 and 17 is increased with an increase in the differential torque $T_w$. Then, when the absolute value $\omega_c$ reaches the threshold diff set at point t12, the function $F_{map}(T_{LSD})$ is updated based on the target torque $T_{LSD\_end}$ measured after reducing the backlash. Thus, as indicated in FIG. 23, the first course of the backlash reduction and the updating of the end point are executed from point t0 to point t12.

When the first course of the backlash reduction and the updating of the end point have been completed at point t12, the backlash timer $t_{squp}$ is reset to start measuring elapsed time from the commencement of the backlash reduction, and the second course of the backlash reduction is continued until point t13 at which the count value of the backlash timer $t_{squp}$ reaches the completion time $T_k$. The second course of the backlash reduction is executed in the similar fashion as the first course, but in the example shown in FIG. 23, the differential limit torque $T_{LSD}$ to each of the limited slip differentials 11 and 18 is increased. In addition, a direction to reduce the backlash between the gears is reversed.

The second course of the updating of the end point of the required time t is executed from point t13 to point t14 at which the absolute value $\omega_c$ reaches the threshold $\omega_{diff\_set}$ in the similar fashion as the first course. In the example shown in FIG. 23, however, a value and direction of the differential limit torque $T_{LSD}$ to each of the limited slip differentials 11 and 18 are altered. Specifically, the differential limit torque $T_{LSD}$ in second course is increased from the differential limit torque $T_{LSD}$ in first course. In addition, a direction to reduce the backlash between the gears is reversed.

The backlash reduction and the updating are repeated until the number of times of repetition reaches the number $i_{max}$ (specifically, three times in FIG. 23). Then, the updating of the end point of the required time t is completed at point t16. At point t16, therefore, the determination signal $SEQ_{st}$ is set to 0, and the flag $F_{fin}$ is turned on.

Although the above exemplary embodiments of the present application have been described, it will be understood by those skilled in the art that the present application should not be limited to the described exemplary embodiments, and various changes and modifications can be made within the spirit and scope of the present disclosure.

What is claimed is:

1. A driving force control system for a vehicle comprising:
a torque vectoring device comprising
a differential mechanism that distributes torque delivered from a prime mover to a right wheel and a left wheel through a plurality of rotary elements including gears,
a differential motor that controls a split ratio of the torque distributed to the right wheel and the left wheel by applying differential torque to any one of the rotary elements, so as to allow the right wheel and the left wheel to perform a differential rotation therebetween,
a limited slip differential that limits the differential rotation between the right wheel and the left wheel by applying a frictional braking force to a rotary member between the differential motor and the limited slip differential thereby applying differential limit torque to the rotary member; and
a controller that controls the differential motor and the limited slip differential; and
the torque vectoring device having an operating mode that is switched between differential mode in which the differential torque overwhelms the differential limit torque and a differential limit mode in which the differential limit torque overwhelms the differential torque,
wherein the controller is configured to:
bring the torque vectoring device into a preparatory state in which the differential torque and the differential limit torque are equalized to each other when shifting the operating mode between the differential mode and the differential limit mode; and
shift the operating mode of the torque vectoring device between the differential mode and the differential limit mode by gradually reducing a difference between the differential torque and the differential limit torque.

2. The driving force control system for a vehicle as claimed in claim 1, wherein the controller is further configured to gradually reduce the difference between the differential torque and the differential limit torque by changing at least any one of the differential torque and the differential limit torque based on at least any one of a changing function (t) and a changing coefficient.

3. The driving force control system for a vehicle as claimed in claim 2, wherein the changing function and changing coefficient include a first changing function and a first changing coefficient for changing at least any one of the differential torque and the differential limit torque, and a second changing function and a second changing coefficient for changing the other one of the differential torque and the differential limit torque.

4. The driving force control system for a vehicle as claimed in claim 1,
wherein the differential mechanism includes a transmission mechanism, and
wherein the controller is further configured to reduce backlash in the transmission mechanism by generating the differential limit torque while keeping the differential torque constant.

5. The driving force control system for a vehicle as claimed in claim 1, wherein the controller is further configured to:
obtain at least one of the differential torque and the differential limit torque by increasing the differential torque while keeping the differential limit torque constant in a factory before shipment or when the vehicle is stopped; and
update a design value of the differential torque or the differential limit torque in the preparatory state.

6. The driving force control system for a vehicle as claimed in claim 5, wherein the controller is further configured to obtain at least one of the differential torque and the differential limit torque in the preparatory state by increasing the differential torque in a forward direction while keeping the differential limit torque to a first torque, and by increasing the differential torque in a reverse direction while keeping the differential limit torque to a second torque.

* * * * *